US005993048A

United States Patent [19]

Banks et al.

[11] Patent Number: 5,993,048

[45] Date of Patent: *Nov. 30, 1999

[54] PERSONALIZED GREETING CARD SYSTEM

[75] Inventors: Thomas Benton Banks, Prairie Village; Michael Lynn Vandemark, Shawnee; Wallace Allan Yeskie; David Allen Mullin, both of Overland Park, all of Kans.; Michael Ray Schupp, Belton, Mo.

[73] Assignee: Hallmark Cards, Incorporated, Kansas City, Mo.

[ * ] Notice: This patent is subject to a terminal disclaimer.

[21] Appl. No.: 07/514,670

[22] Filed: Apr. 25, 1990

Related U.S. Application Data

[63] Continuation-in-part of application No. 07/282,013, Dec. 8, 1988, Pat. No. 5,036,472.

[51] Int. Cl.[6] ...................... G06F 17/00

[52] U.S. Cl. ...................... 364/479.03; 364/479.05

[58] Field of Search ...................... 364/479, 478, 364/468, 479.03, 479.05; 414/793, 796; 235/379, 381; 359/111, 155–158, 145–150

[56] References Cited

U.S. PATENT DOCUMENTS

| | | |
|---|---|---|
| Re. 32,115 | 4/1986 | Lockwood et al. . |
| Re. 33,316 | 8/1990 | Katsuta et al. . |
| 3,454,956 | 7/1969 | Icenbice, Jr. et al. . |
| 3,609,250 | 9/1971 | Morris . |
| 3,688,276 | 8/1972 | Quinn . |
| 3,705,384 | 12/1972 | Wahlberg . |
| 3,800,932 | 4/1974 | Dana . |
| 3,828,904 | 8/1974 | Naitou et al. . |
| 3,864,708 | 2/1975 | Allen . |
| 3,892,427 | 7/1975 | Kraynak et al. . |
| 3,898,930 | 8/1975 | Ikegami et al. . |
| 3,932,036 | 1/1976 | Ueda et al. . |
| 3,943,335 | 3/1976 | Kinker et al. . |
| 3,949,375 | 4/1976 | Ciarlo . |
| 3,982,744 | 9/1976 | Kraynak et al. . |

(List continued on next page.)

FOREIGN PATENT DOCUMENTS

| | | |
|---|---|---|
| 1278862 | 1/1991 | Canada . |
| 79302164 | 4/1980 | European Pat. Off. . |
| 83108181 | 3/1984 | European Pat. Off. . |
| 89610037 | 8/1989 | European Pat. Off. . |

(List continued on next page.)

OTHER PUBLICATIONS

Documents published by Hallmark Cards, Inc., no date.

"A 'Full House' Is Dealt to the Card Party," G. Venette (PPR), Apr. 1986, pp. 42–43.

(List continued on next page.)

*Primary Examiner*—James P. Trammell
*Attorney, Agent, or Firm*—Leydig,Voit & Mayer, Ltd.

[57] ABSTRACT

Disclosed is a system for use by an individual customer to obtain a personalized greeting card of high quality, the system comprising: card type selection means for permitting an individual customer to obtain a completed personalized card from one of a plurality of blank cards having a preprinted design on at least a portion thereof and arranged proximate to the customer, design selection means for selection by an individual customer and from a plurality of available designs of a design to be provided on the completed personalized card, the plurality of available designs corresponding, at least in part, to the plurality of preprinted designs on the blank cards, message selection means for use by the individual customer to select particular printing material to be provided on the completed card, and card completion means, and control means for controlling the card completion means from the card type, design and message selection means for supply by the card completion means of a completed greeting card having the weight and quality and having the selected design the selected printed material thereof. Also disclosed is a method for producing personalized greeting cards using the aforementioned system.

22 Claims, 19 Drawing Sheets

U.S. PATENT DOCUMENTS 3,990,710 11/1976 Hughes .
4,007,362 2/1977 Sindermann .
4,023,013 5/1977 Kinker .
4,034,839 7/1977 Lee .
4,041,467 8/1977 Cota et al. .
4,058,056 11/1977 Rubin .
4,070,698 1/1978 Curtis et al. .
4,085,445 4/1978 Blevins et al. .
4,096,933 6/1978 Massa .
4,144,656 3/1979 Podkopaev et al. .
4,160,271 7/1979 Grayson et al. .
4,173,024 10/1979 Miller .
4,190,819 2/1980 Burgyan .
4,193,114 3/1980 Benini .
4,239,380 12/1980 Godshall .
4,247,759 1/1981 Yuris et al. .
4,260,229 4/1981 Bloomstein .
4,261,012 4/1981 Maloomian .
4,275,449 6/1981 Aish .
4,297,724 10/1981 Masuda et al. .
4,300,040 11/1981 Gould et al. .
4,305,131 12/1981 Best .
4,308,017 12/1981 Laughon et al. .
4,319,336 3/1982 Anderson et al. .
4,339,134 7/1982 Macheel .
4,345,276 8/1982 Colomb .
4,354,613 10/1982 Desai et al. .
4,358,824 11/1982 Glickman et al. .
4,359,631 11/1982 Lockwood et al. .
4,369,082 1/1983 Kerwin .
4,396,307 8/1983 Shah et al. .
4,412,292 10/1983 Sedam et al. .
4,414,467 11/1983 Gould et al. .
4,414,896 11/1983 Fischer .
4,417,322 11/1983 Berry et al. .
4,417,722 11/1983 Ishii et al. .
4,418,390 11/1983 Smith et al. .
4,431,323 2/1984 Kulow .
4,434,467 2/1984 Scott .
4,435,772 3/1984 Suzuki et al. .
4,436,776 3/1984 Wojcik .
4,441,160 4/1984 Azcua et al. .
4,449,186 5/1984 Kelly et al. .
4,458,802 7/1984 Maciver et al. .
4,459,676 7/1984 Oguchi .
4,460,957 7/1984 Eggebrecht et al. .
4,463,874 8/1984 Friedman et al. .
4,481,590 11/1984 Otten .
4,484,304 11/1984 Anderson et al. .
4,488,224 12/1984 Ippolito .
4,488,244 12/1984 Freeman .
4,489,389 12/1984 Beckwith et al. .
4,498,139 2/1985 Malinovsky .
4,517,578 5/1985 Tazaki .
4,519,037 5/1985 Brodeur et al. .
4,528,643 7/1985 Freeny, Jr. .
4,530,009 7/1985 Mizokawa .
4,542,378 9/1985 Suganuma et al. .
4,546,434 10/1985 Gioello .
4,553,222 11/1985 Kurland et al. .
4,559,598 12/1985 Goldwasser et al. .
4,567,359 1/1986 Lockwood .
4,575,813 3/1986 Bartlett et al. .
4,577,206 3/1986 Hibino .
4,591,983 5/1986 Bennett et al. .
4,596,924 6/1986 Watanabe .
4,598,376 7/1986 Burton et al. .
4,598,378 7/1986 Giacomo .
4,599,598 7/1986 Komoda et al. .
4,602,286 7/1986 Kellar et al. .
4,603,966 8/1986 Brownstein .
4,608,662 8/1986 Watanabe et al. .
4,610,200 9/1986 Metso .
4,616,327 10/1986 Rosewarne et al. .................... 364/518
4,616,926 10/1986 DiPietro et al. .
4,621,443 11/1986 Weinreich .
4,623,292 11/1986 Suzuki et al. .
4,625,275 11/1986 Smith .
4,627,015 12/1986 Stephens .
4,640,529 2/1987 Katz .
4,641,197 2/1987 Miyagi .
4,646,250 2/1987 Childress .
4,650,977 3/1987 Couch .
4,652,998 3/1987 Koza et al. .
4,654,799 3/1987 Ogaki et al. .
4,655,026 4/1987 Wigoda .
4,664,546 5/1987 Runzi .
4,672,554 6/1987 Ogaki .
4,672,683 6/1987 Matsueda .
4,674,041 6/1987 Lemon et al. .
4,674,055 6/1987 Ogaki et al. .
4,677,565 6/1987 Ogaki et al. .
4,677,570 6/1987 Taki .
4,683,536 7/1987 Yamamoto .
4,699,532 10/1987 Smith .
4,700,317 10/1987 Watanabe et al. .
4,700,318 10/1987 Ockman .
4,703,465 10/1987 Parker .
4,710,885 12/1987 Litteken .
4,711,543 12/1987 Blair et al. .
4,712,174 12/1987 Minkler, II .
4,712,909 12/1987 Oshikoshi .
4,714,957 12/1987 Takano .
4,719,885 1/1988 Nagano et al. .
4,722,053 1/1988 Dubno .
4,723,212 2/1988 Mindrum et al. .
4,724,468 2/1988 Bulls .
4,726,697 2/1988 Maedge et al. .
4,727,589 2/1988 Hirose et al. .
4,731,743 3/1988 Blancato .
4,733,362 3/1988 Haraguchi .
4,736,306 4/1988 Christensen et al. .
4,740,904 4/1988 Nagle .
4,750,131 6/1988 Martinez .
4,750,151 6/1988 Baus .
4,760,245 7/1988 Fukaya .
4,764,867 8/1988 Hess .
4,764,880 8/1988 Pearl .
4,766,581 8/1988 Korn et al. .
4,767,917 8/1988 Ushikubo .
4,769,694 9/1988 Oshikoshi .
4,771,401 9/1988 Kaufman et al. .
4,775,935 10/1988 Yourick .
4,779,080 10/1988 Coughlin et al. .
4,787,050 11/1988 Suzuki .
4,789,147 12/1988 Berger et al. .
4,789,907 12/1988 Fischetti et al. .
4,801,375 1/1989 Padilla .
4,811,240 3/1989 Ballou et al. .
4,814,592 3/1989 Bradt et al. .
4,817,005 3/1989 Kubota et al. .
4,817,043 3/1989 Brown .
4,818,854 4/1989 Davies et al. .
4,833,307 5/1989 Gonzalez-Justiz .
4,835,683 5/1989 Phillips et al. .
4,839,505 6/1989 Bradt et al. ............................ 364/479
4,839,829 6/1989 Freedman .
4,845,635 7/1989 Rosselli .
4,847,473 7/1989 Lee et al. .
4,847,761 7/1989 Ferriter .
4,847,764 7/1989 Halvorson .
4,852,013 7/1989 Durst, Jr. et al. .

| | | |
|---|---|---|
| 4,862,376 | 8/1989 | Ferriter . |
| 4,866,661 | 9/1989 | De Prins . |
| 4,873,643 | 10/1989 | Powell et al. . |
| 4,882,675 | 11/1989 | Nichtberger et al. . |
| 4,884,199 | 11/1989 | Boothroyd et al. . |
| 4,884,212 | 11/1989 | Stutsman . |
| 4,891,660 | 1/1990 | Biondo, Jr. . |
| 4,896,208 | 1/1990 | Moriya et al. . |
| 4,896,791 | 1/1990 | Smith . |
| 4,903,815 | 2/1990 | Hirschfeld et al. . |
| 4,916,637 | 4/1990 | Allen et al. . |
| 4,918,604 | 4/1990 | Baum . |
| 4,937,439 | 6/1990 | Wanninger et al. . |
| 4,949,257 | 8/1990 | Orbach . |
| 4,951,203 | 8/1990 | Halamka . |
| 4,954,956 | 9/1990 | Yamakawa et al. . |
| 4,962,475 | 10/1990 | Hernandez et al. . |
| 4,970,655 | 11/1990 | Winn et al. . |
| 4,982,337 | 1/1991 | Burr et al. . |
| 4,982,343 | 1/1991 | Hourvitz et al. . |
| 4,982,346 | 1/1991 | Girouard et al. . |
| 4,982,349 | 1/1991 | Cahall, Jr. et al. . |
| 4,991,108 | 2/1991 | Hamilton . |
| 4,992,940 | 2/1991 | Dworkin . |
| 4,993,587 | 2/1991 | Abe . |
| 4,999,065 | 3/1991 | Wilfert . |
| 5,016,183 | 5/1991 | Shyong . |
| 5,017,953 | 5/1991 | Biondo, Jr. . |
| 5,018,085 | 5/1991 | Smith, Jr. . |
| 5,020,958 | 6/1991 | Tuttobene . |
| 5,025,397 | 6/1991 | Suzuki . |
| 5,025,399 | 6/1991 | Wendt et al. . |
| 5,029,099 | 7/1991 | Goodman . |
| 5,034,806 | 7/1991 | Ikeda et al. . |
| 5,036,472 | 7/1991 | Buckley et al. . |
| 5,038,293 | 8/1991 | Goodman . |
| 5,040,132 | 8/1991 | Schuricht et al. . |
| 5,047,613 | 9/1991 | Swegen et al. . |
| 5,053,956 | 10/1991 | Donald et al. . |
| 5,056,029 | 10/1991 | Cannon . |
| 5,061,098 | 10/1991 | Engelhardt et al. . |
| 5,072,253 | 12/1991 | Patton . |
| 5,088,052 | 2/1992 | Spielman et al. . |
| 5,088,586 | 2/1992 | Isobe et al. . |
| 5,113,351 | 5/1992 | Bostic . |
| 5,153,825 | 10/1992 | Yauk et al. . |
| 5,172,245 | 12/1992 | Kita et al. . |
| 5,187,797 | 2/1993 | Nielsen et al. . |

FOREIGN PATENT DOCUMENTS

| | | |
|---|---|---|
| 90313 917 | 4/1991 | European Pat. Off. . |
| 91 309669 | 10/1991 | European Pat. Off. . |
| 2 576 437 | 7/1986 | France . |
| 2621153 | 9/1987 | France . |
| 87 13494 | 9/1987 | France . |
| 89 09224 | 1/1991 | France . |
| 59-33573 | 2/1984 | Japan . |
| 59-194263 | 11/1984 | Japan . |
| 2-27372 | 8/1988 | Japan . |
| 1005827 | 9/1965 | United Kingdom . |
| 2 050106A | 12/1980 | United Kingdom . |
| 2 065412A | 6/1981 | United Kingdom . |
| 2 092 354 | 8/1982 | United Kingdom . |
| 2 105 075 | 3/1983 | United Kingdom . |
| 2 119 600 | 11/1983 | United Kingdom . |
| 2150728 | 7/1985 | United Kingdom . |
| 2 180 427 | 3/1987 | United Kingdom . |
| 2177245 | 10/1988 | United Kingdom . |
| 2 208460A | 3/1989 | United Kingdom . |
| 2 222341A | 2/1990 | United Kingdom . |
| 2 240897A | 8/1991 | United Kingdom . |
| WO 82/00123 | 1/1982 | WIPO . |
| 82/00123 | 8/1982 | WIPO . |
| WO 91/09385 | 8/1982 | WIPO . |
| WO 83/00461 | 2/1983 | WIPO . |
| WO 83/00628 | 3/1983 | WIPO . |
| WO 86/04703 | 8/1986 | WIPO . |
| WO 90/07166 | 6/1990 | WIPO . |
| WO 91/06913 | 5/1991 | WIPO . |
| WO 92/02909 | 2/1992 | WIPO . |

OTHER PUBLICATIONS

"The Computer Poet," Sales Brochure, © Oct. 1984 The Computer Poet Corporation.

"Let's Make Calendars & Stationery™," Melody Hall™, Printware Series™, © 1986 Kyocera Unison, Inc.

Printmaster printout, date unknown (From Patent Office Examiner's Personal File).

"Got Something To Announce, Promote, Sell?," 1987, G. Solomon (Family Computing, Jun. 1987, starting at p. 43.

"Create Your Own Greeting Cards," 1983, M. Adler (microcomputer software, Jan. 1, 1985, p. 655).

"Cards Offer High–Tech Greetings," 1983, T. Shea (InfoWorld, Apr. 18, 1983, starting at p. 1).

Article by Kerlow entitled "The Computer as an Artistic Tool," Sep. 1984, Byte Magazine, starting at p. 189.

Article by Cooper entitled "Computer Landscapes," Sep. 1984, Byte Magazine, starting at p 211.

Article by Heiser entitled "A Weaving Simulator," Sep. 1982, Byte Magazine, starting at p. 512.

"Underware"™, 1986 catalog listing "Print Custom Designs on T–Shirts . . . in Color with your Computer and Printer ! ! !".

Compucards item in "What's New?" at p. 574 of the Dec. 1983 issue of Byte Magazine.

"Comp–U–Store System Could Change Retail Economics," Jul. 1983, DIrect Marketing Magazine, staring at p. 101.

"Setting Up Shop On Computer Screens," Mar. 1984, Nation's Business Magazine, staring at p. 57.

"Touchcom™ Interactive Videodisc Catalog Markets Furniture at Dayton's," Sep.–Oct. 1985, VIde3odisc and Optical Disk, staring at p. 343.

"Retailers Beginning to Tune in VIdeo Displays," Nov. 18, 1985, Advertising Age vol. 56, No. 90, starting at p. 66.

"These Instant–Win Games Talk Back," May 1, 19__, Adweek's Promote, staring at p. 4, date unknown.

"Cardmarketing . . . Your Way To A Powerful Database," Paul W. Corliss, Jr., Excerpt of Presentation to the Direct Marketing Assoc. 71st Annual Conference, date unknown.

"The Sports Vacation NEtwork" Sales Brochure, The sports Vacation Network™, Research and Development by Intermark®, date unknown.

"Vision 1000: The Total Promotion Delivery Vehicle," Sales Brochure, Advanced Promotion Technologies, date unknown.

"Which Way To Go With Interactive Video?," Sales Brochure, © 1987 Interac Corporation.

"Interactive VIdeo Merchandising," Sales Brochure, ByVIdeo Inc. dated May 1988.

"The Right Medium The Right Moment," Sales Brochure, Advanced Interactive Video, date unknown.

"Exhibit SOurce, Inc. COmpany Background," Sales Brochure, Exhigit Source, Inc. date unknown.

"Food Chain Employs Scanning Technology In Instant Win/Prize Drawing Promotion," Incentives In Action, Premium/Incentive Business Magazine, starting at p. 22, date unknown.

"High Tech Bard of Greeting Cards", Nations Business, Fib. 1985, 1 page.
Card Shop Brochure, Artsci, 1986, 1 page.
The Social Secretary Brochure, 5 pages (date unknown).
"The Card/O/Mat."Brochure, 6 pages, (date unknown).
"7–Eleven to Sell Do–it–yourself Tickets"; Insight, Jan. 16, 1989, p. 42.
"In–store computer designs home projects" design News, Oct. 23, 1989, p. 38.
"Now There's a Robot", Design News, Mar. 26, 1990, pp. 78–81.
Tyler, Michael, "Touchscreens: Big Deal or No Deal," *Datamation,* vol. 30, No. 1 (Jan. 1984) pp. 146–54.
Albert, Alan E., "The effect of Graphic Input Devices on Performance in a Cursor Position Task," *Proceedings of the 26th Annual Meeting of the Human Factors Society* (1982) pp. 54–57.
English, William K., Englehart, Douglas C., and Berman, Melvyn L., "Display — Selection Techniques for Text Manipulation,"*IEEE Transactions on Human Factors in Electronics,* HFE–8 1 (Mar. 1967), pp. 5–15.
Shneiderman, Ben, *Designing the User Interface,* Reading MA: Addison–Wesley Publishing CO., Inc. (1987), pp. 271–282.
Homan, Edward J., "How Computerized Cards Make This Shop 'Truly A Treat'", *Greetings Magazine,* vol. 55, No. 3, Jan. 1987, pp. 12, 13, and 24.
Date, C.J., *An Introduction to Database SYstems,* vol. I, Third Edition, Reading, MA: Addison–Wesley Publishing Col., Inc. (1981) pp. 120–21.
David Balsam and Martin Kahn, *The Print Shop Reference Manual,* Copyright 1986, 1989 Broderbund Software, Inc. pp. 1–51.
McAndress, Steve, "Magical Poet Literature", pp. 1–20, date unknown.
Database Search Report (9 pages), no date.
Marsh, R. "Automatict Text Generations", Br Telecom Technol J., 6(4), pp. 84–88 (Oct. 1988).
Nieuenbuysen, P. "Criteria For the Evaluation of Text Storage and Retrieval Softward", The Electronic Library, 6(3), pp. 160–166 9 Jun. 1988).
Tanaka, M. et al. "A Visual User Interface for Map Information", no date.
Eastman Kodak, "Photo Enlargements VFia Vending Machine; Kodak Create–A–Pring 35 mm Enlargement Center", 60(9), p. 12, 1988 — Lexis Report, pp. 3–4.
Smith, M.W. et al., "The Interactive Display Design Tool: An Application Program for Human Factors Part–Task Simulation Development", IEEE, pp. 856–859 (1988).
Craven, T.C., "Adapting of String Indexing Systems for Retrieval Using Proximity Operators", Information Processing & Management, 24(2), p. 133–140 (1988).
Meadow, C.T., "Oakdec, a Program for Studying the Effects On Users of a Procedural Expert System for Database Searching", Information Processing & Management, 24(4), pp. 449–457 (1988).
Cameron, K.L., et al., "Producing Geological Illustrations Using PC–Based Computer–Aided Drafting", COmputers & Geosciences, 14(3), pp. 291–297 (1988).
Yamamoto, A., et al., "Image Retrieval System Based on Object Features", IEEE Montech, pp. 132–134 (1987).
"Products", 1 page, no date.
Bovey, J.D. et al, "Interactive Document DIaplay and its Use in Information Retrieval", Journal of Documentation, 43(2), pp. 125–137 (Jun. 1987).
Stefik, D.G. Bodrow, et al., "SYSIWIS Revised: Early Experiences with Multiusers Interfaces", ACM Transactions on Office Information SYstems, 5(2), pp. 147–167 (1987).
Bihr, R.A., "AUtomated Storage and Retrieval of Works Standards", Computers Ind. Engng., 13(1–4) pp. 312–316 (1987).
Biswas, Gautam, et al., "Knowledge–Assisted Document Retrieval: I. The Natural–Language Interface", Journal of the American Society for Information Science, 38(2), pp. 83–96 (1987).
Biswas, Gautam et al., "Knowledge–Assisted Document Retrieval: II. The Natural–Language Interface", Journal of the American Society for Information Science,38(2), pp. 97–110 (1987).
Jones, P. et al., "A Language for Simple Interactive From a Database System", Data & Knowledge Engineering 2, pp. 303–321 (1987).
Croft, W.B. et al., "$I^3R$: A New Approach to the Design of Document Retrieval Systems", Journal of the American Society for Information Science, 38(6), pp. 389–404 (1987).
Nicholas, J., et al., "Retrieval Techniques", Annual Review of Information Science and Technology, 22, pp. 109–145 (1987).
Frank, A., "Integrating Mechanisms for Storage and Retrieval of Land Data", Surveying and Mapping, 46(2), pp 107–121, no date.
Restorick, F.M., "Novel Filing Systems Applicable to an Automated Office: A State–of–the–Art Study", Information Processing & Management, 22(151–172 (1986).
Crawford, R.G., et al., "A Novice User's Interface to Information Retrieval Systems", Information Processing & Management, 22(4) pp. 2857–298, (1986).
Strong, G.W., et al., "A Thesaurus for End–User Indexing", Information Processing & Management, 22(6), pp. 487–492 (1986).
McDonald, N.N., "Video–graphic Query Facility for Database Retrieval", The Visual Computer, 2, pp. 72–77 (1986).
Crain News Service, "Retailers Beginning to Tune in Video DIaplays", Advertising Age, p. 66 (1985).
Cohill, A.M., et al., "Retrieval of HELP Information for Novice Users of Interactive Computer Systems", The Human Factors Society,Inc., 27(3), pp. 335–343 (1985).
Salton, G., e al., "Advanced Feedback Methods in Information Retrieval", Journal of the American Society for Information Science, 36((3), pp. 200–210 (1985).
Bansier, J. et al., "Filing and Retrieval of Unstructured Information: Some System Considerations", ESPRIT, pp. 295–313 (1985).

Takagi, T. et al., "A Frame–based Interface for Questions–Answering Systems", IEEE, pp. 388–393 (1985).
Laender, A.H.F., et al., "An Interactive Database End User Facility for the Definition and Manipulation of Forms", pp. 41–54.
Lyman, W., et al., "CAD Generation of Accident Diagrams for Local Agencies", pp 657–664, no date.
Croft, W.B., et al., "The Use of Adaptive Mechanisms for Selection of Search Strategies in Document Retrieval Systems", Dept. of Computer and Information Science, University of Massachusetts, pp. 95–110, no date.
Yeazel, L.A., "Point–of–Purchase — The Decision to Buy", Pioneering Perspective, pp. 36–37, no date.

Creative Expressions, "Creative Expressions — Bringing Feelings to Life Through Technology" Brochure (date unknown).

North DeKalb News/Sun, "Computer Lends Personal Touch to Greetings", Feb. 19, 1986.

Article from PPR Magazine, p. 43, 1986.

Current Catalog© 1986.

Current Catalog© 1987.

"7–Eleven to Sell Do–It–Yourself Tickets", *Insight,* p. 42 (Jan. 1986).

PERSONALIZED GREETING CARD SYSTEM

REFERENCE TO RELATED APPLICATION

This application is a continuation-in-part of application Ser. No. 07/282,013, filed Dec. 8, 1988, now U.S. Pat. No. 5,036,472, the disclosure of which is incorporated herein by reference.

BACKGROUND OF THE INVENTION

1. Field of the Invention

This invention relates to a personalized greeting card system and more particularly to a personalized greeting card system which is such that the user may quickly select from a wide variety of possible options to obtain a high quality card with a design and with printed text such as to be personalized with respect to the sender, recipient and occasion. The system uses relatively inexpensive equipment in a manner such as to obtain highly reliable and efficient operation with minimal waste of materials.

2. Background of the Prior Art

As discussed in the introductory portion of the specification of the aforesaid related application of Buckley et al., U.S. Pat. Nos. 3,892,427 and 3,982,744 disclose methods for the production of personalized "ME" books in which, for example, the name of a child who is to receive a story book is printed in the text of a story book. In the production of such books, a computer was used to control a printer to print variable data on preprinted sheet material to form sheets which were bound together in a separate operation to provide the final hard cover book product. As disclosed, many types of variable data could be stored in the computer and such variable data may include quality control indicia which may include check bars or other graphics.

The Rosewarne et al. U.S. Pat. No. 4,616,327 discloses methods similar to those disclosed in the "ME" book patents and the printing of specific types of graphics including pictorial figures having physical characteristics similar to personalized data introduced into the system. A standard microprocessor is programmed to provide storage and combining functions after personalized data is introduced into the system by temporary storage by the purchaser or user on a storage medium such as a punched card. One or more plotters are used for producing the final product, an eight pen plotter being disclosed.

Many vending machines have heretofore been provided for vending of cans, bottles, hot and cold liquids in cups, sandwiches, candy, combs, and various other products, each machine being typically designed to handle only products which have a physical size and shape within a certain limited range. Typically, a customer inserts a coin in a slot and makes a selection by pushing a button or by effecting movement of an article carrier to position a selected article at an exit position.

The aforesaid Buckley et al. application discloses a machine for vending greeting cards and similar personalized products and which is readily operable by a customer without assistance to obtain personalized or customized products of his or her choice. The machine includes means for displaying identifications of available products and desirable attributes and features thereof and of modes of selection such as to facilitate selection of products and the desired attributes and features by the customer, and provides a flexible manufacturing platform which allows for quick changes of product storage means to allow different products to be manufactured to customer's preferences.

More particularly, the machine of the Buckley et al. application includes an enclosure with selection and payment means on the outside thereof and with product storage and handling means on the inside thereof, all coupled to a computer which is on the inside of the enclosure and which is programmed to deliver a selected product to a receptacle from which it may be removed by the customer. Preferably, available products and their desirable attributes and features are identified both audibly and visually and the computer is programmed to control presentation of a sequence of images and associated sound. In accordance with an important feature, the computer controls a general presentation of a series of descriptions of available products and their features with instructions as to initiating use of the machine. When a customer initiates use of the machine, the computer then controls presentations of specific instructions to the customer to make it possible to make selections easily, quickly and accurately. After a customer's selections are effected, the computer again controls the general presentation and repeats it until another customer's use is initiated. Thus the audible and visual capabilities of the machine are used to maximum advantage.

In an illustrated embodiment of the Buckley et al. application, the images are presented on a CRT screen which is also usable as a touch screen for selection of the desired product and the desired features and attributes thereof. The touch screen or a keyboard or other input device may be used, for example, to select from among a number of different birthday cards and to enter the name and birth date of the intended receiver, the name of the sender and other personalized data.

After a customer selects and pays for a greeting card or other product, a data entering mode may be initiated in which he or she is asked to enter data or otherwise select the form of the final product, as by entering the names of the receiver and sender of a birthday card, for example. The data entering mode may further include operations for viewing and correction of entered data.

SUMMARY OF THE INVENTION

This invention was evolved with the general object of providing a personalized greeting card system which facilitates a selection by a customer of a greeting card meeting all desired criteria relating to the quality of the card and designs and messages thereon.

A further object of the invention is to provide a personalized greeting card system which is highly reliable and trouble-free in operation and which can be provided at relatively low cost.

Important aspects of the invention relate to the inclusion of advantageous features of the disclosure of the Buckley et al. application and to the recognition and discovery of problems with other prior art arrangements and their causes and to an analysis of what is necessary to overcome such problems and otherwise provide an improved personalized greeting card system.

In accordance with the invention, a system is provided for use by an individual consumer to obtain a greeting card of very high quality which is personalized to satisfy to the maximum possible extent the individual preferences of the consumer. In an illustrated embodiment, card type, card design and message selection means are provided using a card rack and an associated touch screen monitor usable by a customer. The monitor and a laser printer at a completion station are both coupled to computer means for control by a sales associate, using a keyboard and a monitor at the completion station, the completion station monitor being separate from the touch screen monitor.

In operation, the system inputs customer identification, card selection and personalized message data supplied by a customer using the touch screen monitor, the computer means being operative to store the data in a file. The customer then goes to the completion station and through operation of the computer means by the sales associate, a trained operator, the stored customer data is input, and checked and edited as necessary, and the sales associate then operates the laser printer to print the final card.

Preferably, and in accordance with an important feature of the invention, sample cards are provided at storage rack, each having a card design and associated suggested message with names and other text which may be supplied by the customer, and with clear instructions as to use of the system, for reference by the customer in preparation for and during use of the touch screen monitor. Clear instructions are provided such that after the customer has used the sample card during operation of the touch screen monitor, the customer places the sample card back in its initial position at the front of a pocket in the rack and removes one of a plurality of blank cards from positions behind the initial position of the sample card.

The system permits an individual consumer to see the quality of the card stock and design of the final product, to obtain a completed personalized card of a type having desired weight and quality attributes at least equal to those of conventional printed greeting cards.

The system also permits the individual consumer to obtain a card which is personalized under his or her complete control, to obtain final text which exactly conforms to his or her wishes. Suggestions are provided for text to be included which is very important for many customers, particularly those with little time to spend. However, an important feature is that the customer need not use suggested text but can modify suggested text as desired and can also supply all text if desired.

Further features relate to the provision of sample cards for invitations, announcements and for "Birthday Times" or "Anniversary Times" cards containing newspaper-like reports of events which occurred at the time of birth or the time of marriage of a receiver or receivers of the card. Samples may be provided in bound form, with identifying codes to be entered by the customer for selection of a particular desired form and design of invitation or announcement. These and other features provide a system which is highly flexible and versatile, capable of meeting the desires of customers and reliably providing final products of uniform high quality and at reasonable cost.

This invention contemplates other objects, features and advantages which will become more fully apparent from the following detailed description taken in conjunction with the accompanying drawings.

DESCRIPTION OF PREFERRED EMBODIMENTS

Figure 1:
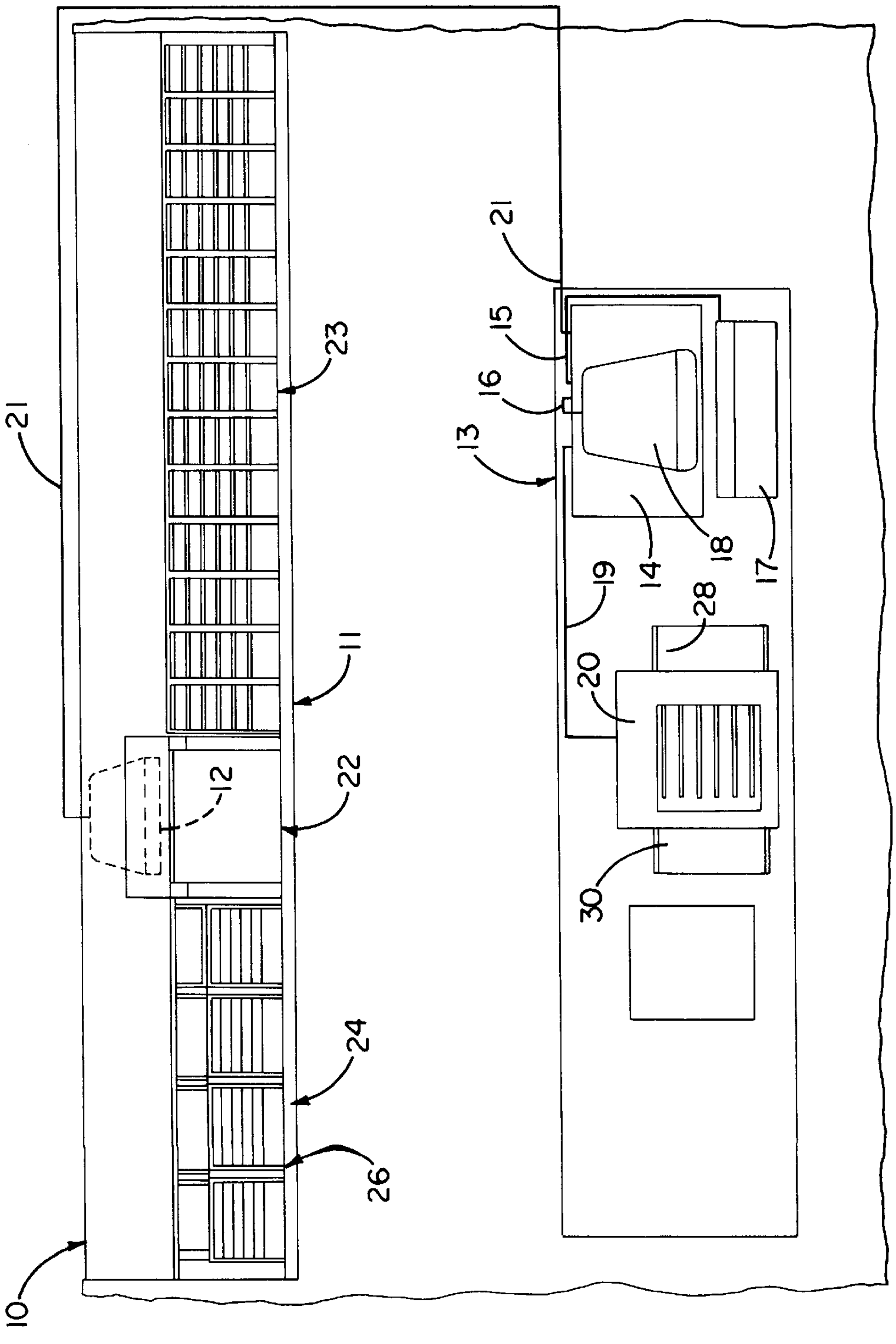
FIG. 1 is a top plan view of a personalized greeting card system of the invention, showing an arrangement of a card rack and associated customer-operated touch screen monitor and an operator-controlled card completion station.

Reference numeral 10 generally designates a personalized greeting card system which is constructed in accordance with the principles of this invention. The system 10 comprises a card rack 11 and associated touch screen monitor 12 for operation by a customer and a card completion station 13 for operation by an operator or sales associate who has been trained for operation of equipment at the station.

In the operation of the system, a customer selects a sample card from a pocket of the card rack 11, uses it and the touch screen monitor 12 to record his or her selection of a card or cards and personalized printed material to be imprinted thereon, replaces the sample card in the same pocket in the rack 11, removes a corresponding blank card from the card rack 11 and takes it to the sales associate at the completion station 13 for printing of the selected personalized printed material. In accordance with the invention, instructions and other indicia on the sample and blank cards, screens produced on the monitor 12, equipment at the completion station 13 and the operation of the monitor 12 and completion station 13 are so correlated and arranged as to facilitate a customer's selection of cards and material to be imprinted thereon and completion of printing of cards with a high degree of reliability, to obtain a personalized greeting card which fully satisfies a customer's desires and which is of very high quality.

The completion station 13 comprises a computer 14 connected through cables 15 and 16 to an associated keyboard 17 and monitor 18, and connected through a cable 19 to a laser printer 20 and through a cable 21 to the touch screen monitor 12. By way of example, the computer may be an Everex computer having a 386 processor and a UNIX operating system, operative in a multitasking mode for effectively simultaneous operation of the touch screen monitor 12 and editing and printing at the completion station 13. At the completion station, keyboard is operated only by the trained sales associate and for relatively simple control and data entry operations, such that the monitor 18 may preferably be a monochrome type of monitor. An important feature is that the laser printer 18 is specially designed for printing on heavy paper stock or cardboard such as stock used for high quality greeting cards. With operation by a trained sales associate, high quality cards are assured.

Figure 2:
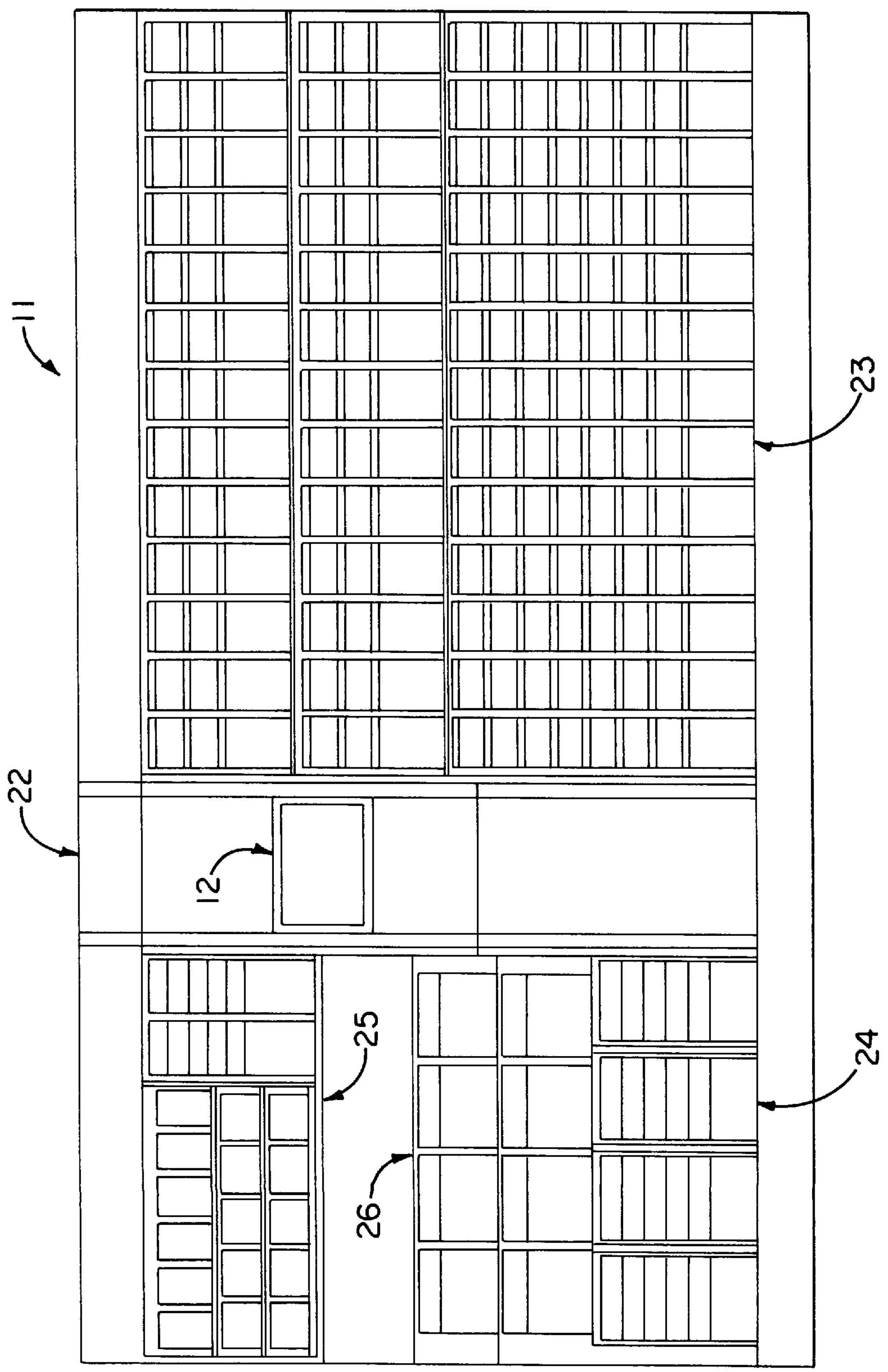
FIG. 2 is a front elevational view of the card rack and associated customer-operated touch screen monitor of the system of FIG. 1.

The arrangement of the card rack 11 and touch screen monitor 12 are best illustrated in the elevational view of FIG. 2. The monitor 12 is positioned in a central section 22 which divides the rack into a right hand section 23 used for greeting cards and a left hand section 24 which is divided into an upper invitation and announcement section 25 and a lower "Personalized Times" section 26. In the illustrated arrangement, the right hand greeting card section 23 has pockets arranged to receive 196 greeting cards for almost any everyday occasion, and with a wide variety of designs and messages. The cards are not simply "fill-in-the-blank" cards and, as will be discussed, a customer can write the entire message on a card if desired.

At each receiving pocket of the right hand section 23, a sample card is provided, together with a plurality of corresponding blank cards therebehind, each blank card being printed with the same design as the sample card but lacking printed material which may be supplied in part or in whole by the customer, and which is applied to the card in the printing operation at the completion station 13.

In a typical operation, a customer will remove a sample greeting card from the right-hand section of the rack 11 and go to the touch screen monitor 12 which is normally displaying a sequence of introductory screens which explain the features and operation of the system and which contain a message inviting the customer to touch the screen to obtain more information or to personalize a card.

Figure 3:
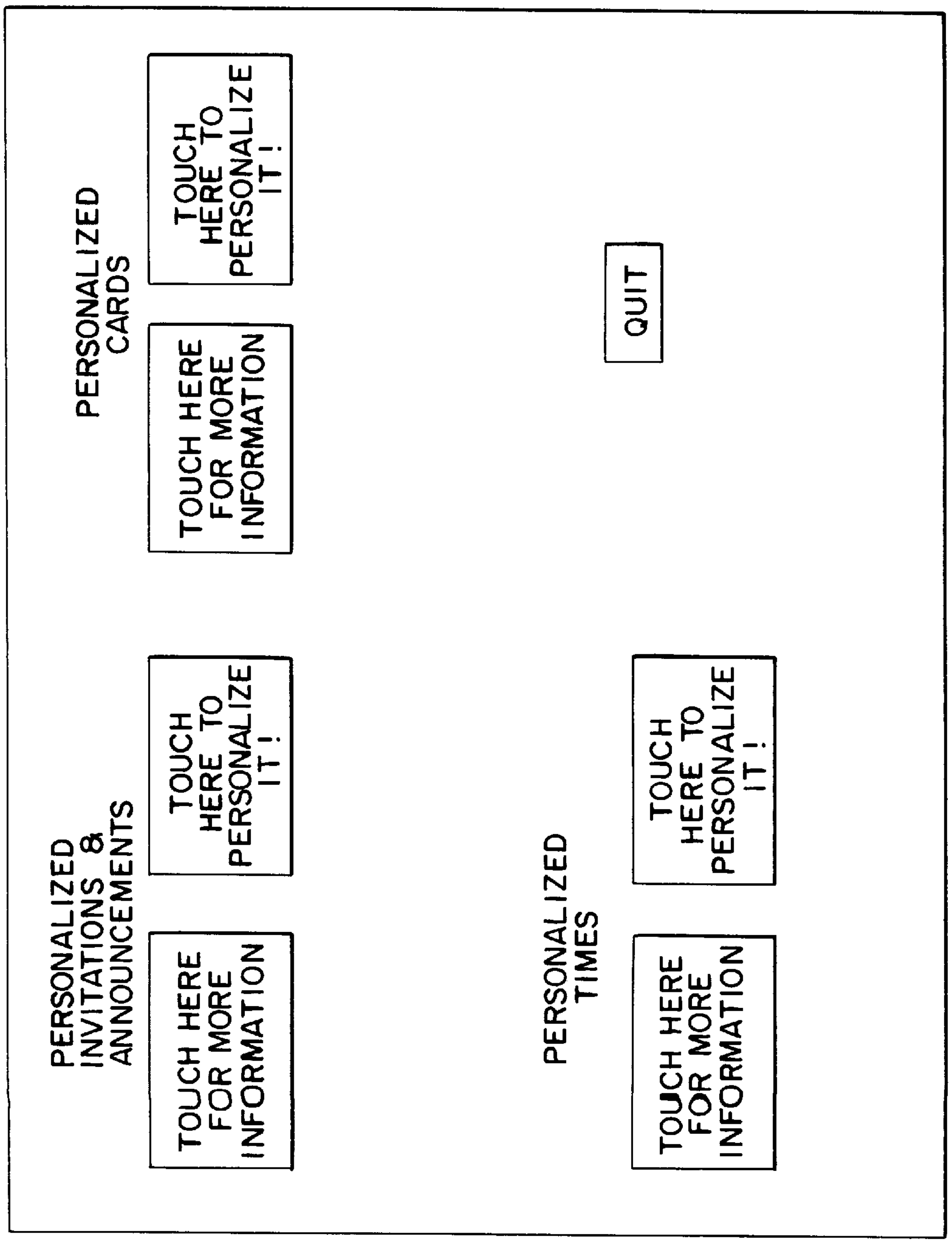
FIG. 3 illustrates a main menu screen produced on the touch screen monitor during operation of the system.
Figure 4:
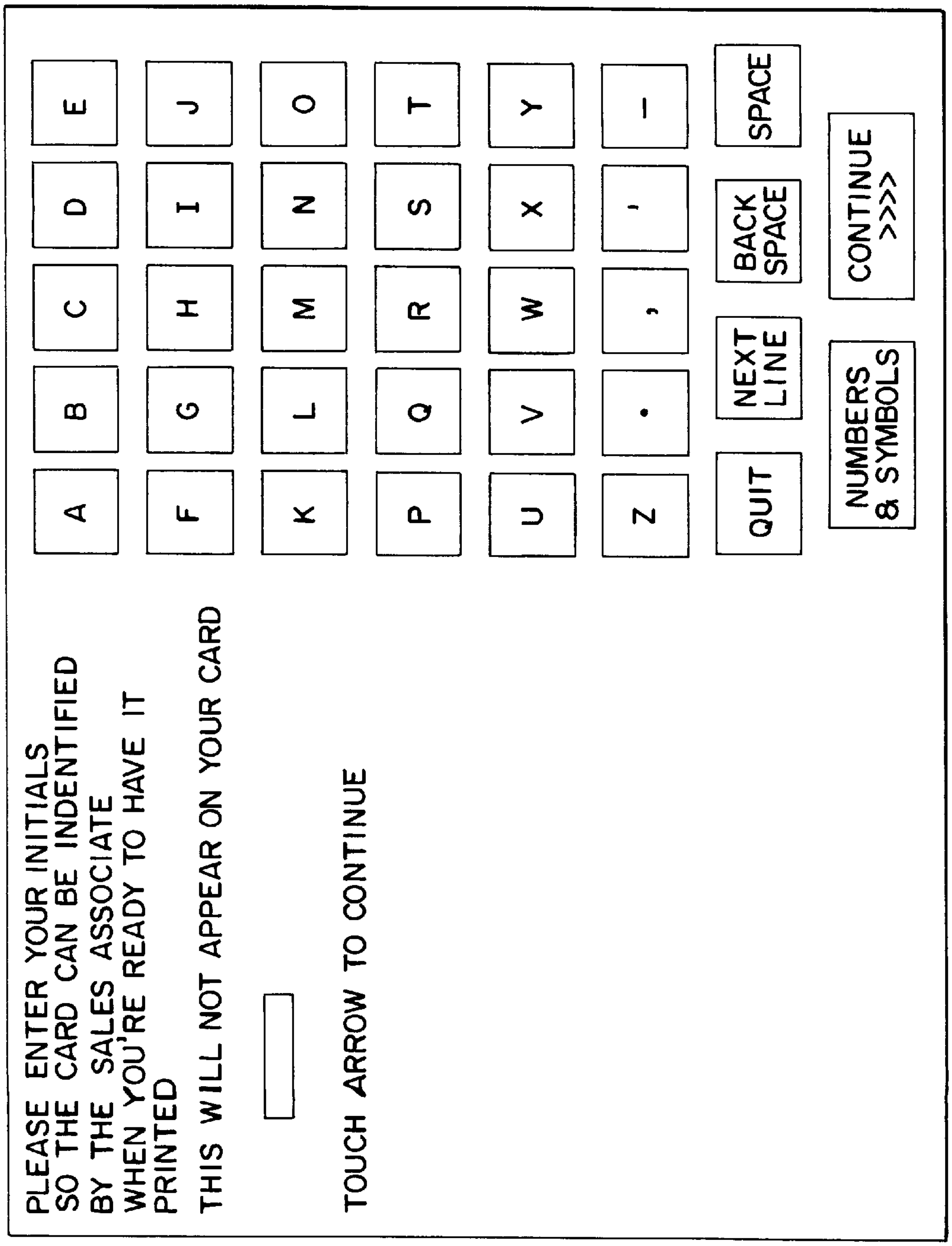
FIG. 4 illustrates a screen produced on the touch screen monitor for entry of a customer's initials.

Upon touching the screen of the monitor 12, a main menu is produced as illustrated in FIG. 3, which is self explanatory. If, for example, the customer touches in the area under "Personalized Cards" which is labelled "Touch here to Personalize It!", the screen of FIG. 4 is produced on the touch screen monitor 12 for entry of a customer's initials. As shown, a keyboard is displayed on the screen including a box in which initials are to appear and areas or boxes which may be touched for entry of the customer's initials, a back space box which may be used for corrections and a "Continue" box which is pressed if the initials appear to be correct.

Figure 5:
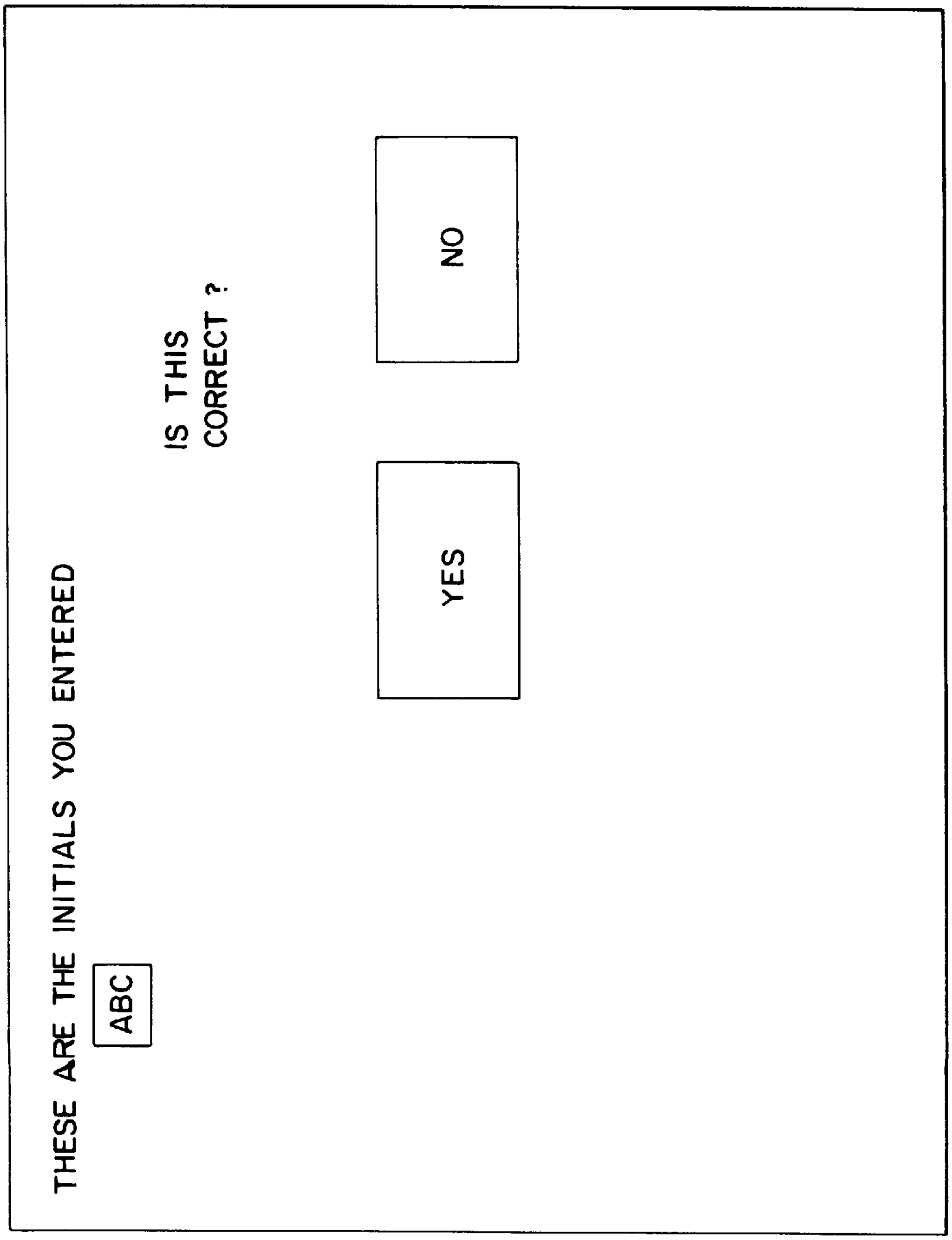
FIG. 5 illustrates a screen produced on the touch screen monitor for verifying initials entered.
Figure 6:
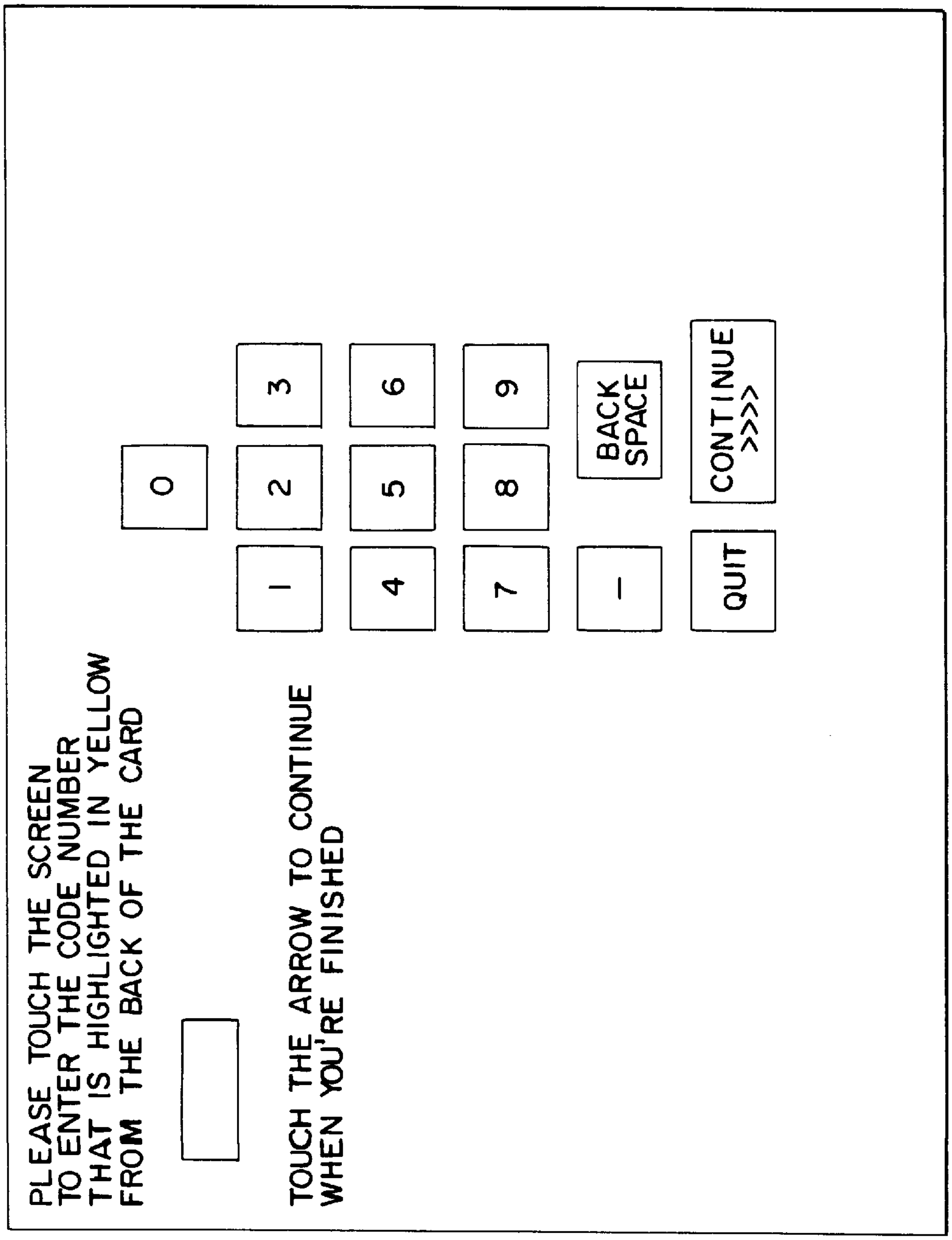
FIG. 6 illustrates a screen produced on the touch screen monitor for entry of a card code number.

If the "Continue" box is touched, the screen of FIG. 5 is produced on the touch screen monitor 12 for verifying initials entered. If the "No" box is touched, the screen of FIG. 4 is again displayed. If the "Yes" box is touched, the screen of FIG. 6 is produced on the touch screen monitor 12 for entry of a card code number. In this case, a numerical keyboard is provided as shown, for entry of the digits of a card code which may preferably be highlighted in yellow on the back of the sample card, as indicated by the screen of FIG. 6.

Figure 7:
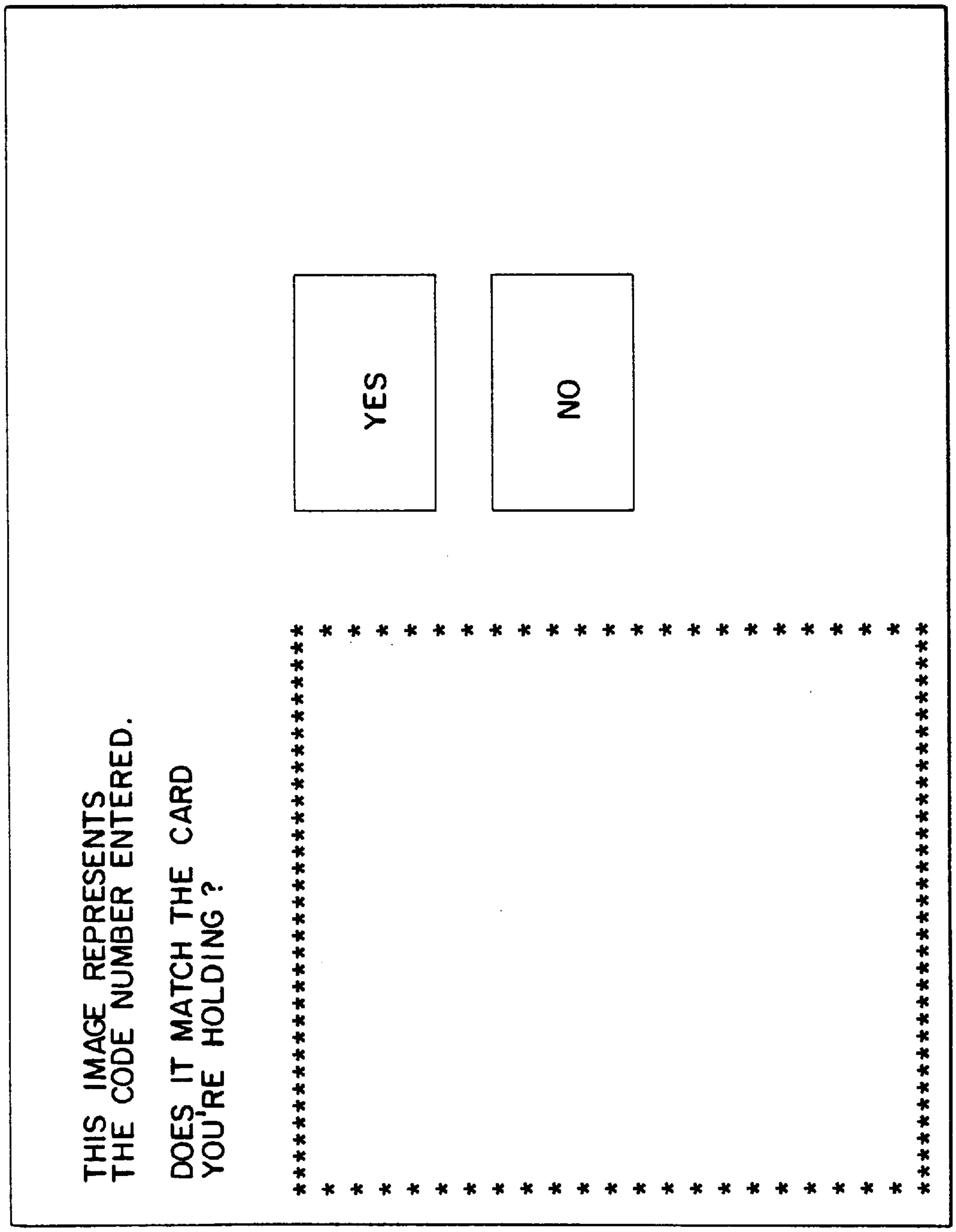
FIG. 7 illustrates a screen produced on the touch screen monitor for verifying that an entered code number corresponds to a card desired by a customer.

After the customer enters the code number and touches the "Continue" box of the screen of FIG. 6, the screen of FIG. 7 is produced by the touch screen monitor 12 for verifying that an entered code number corresponds to a card desired by a customer. In the box outlined by asterisks in the drawing, a full color representation of the design on the front cover of the sample card which corresponds to the entered number is produced. If the customer then touches the "No" box, the screen of FIG. 6 is produced, for entry of the correct number.

Figure 8:
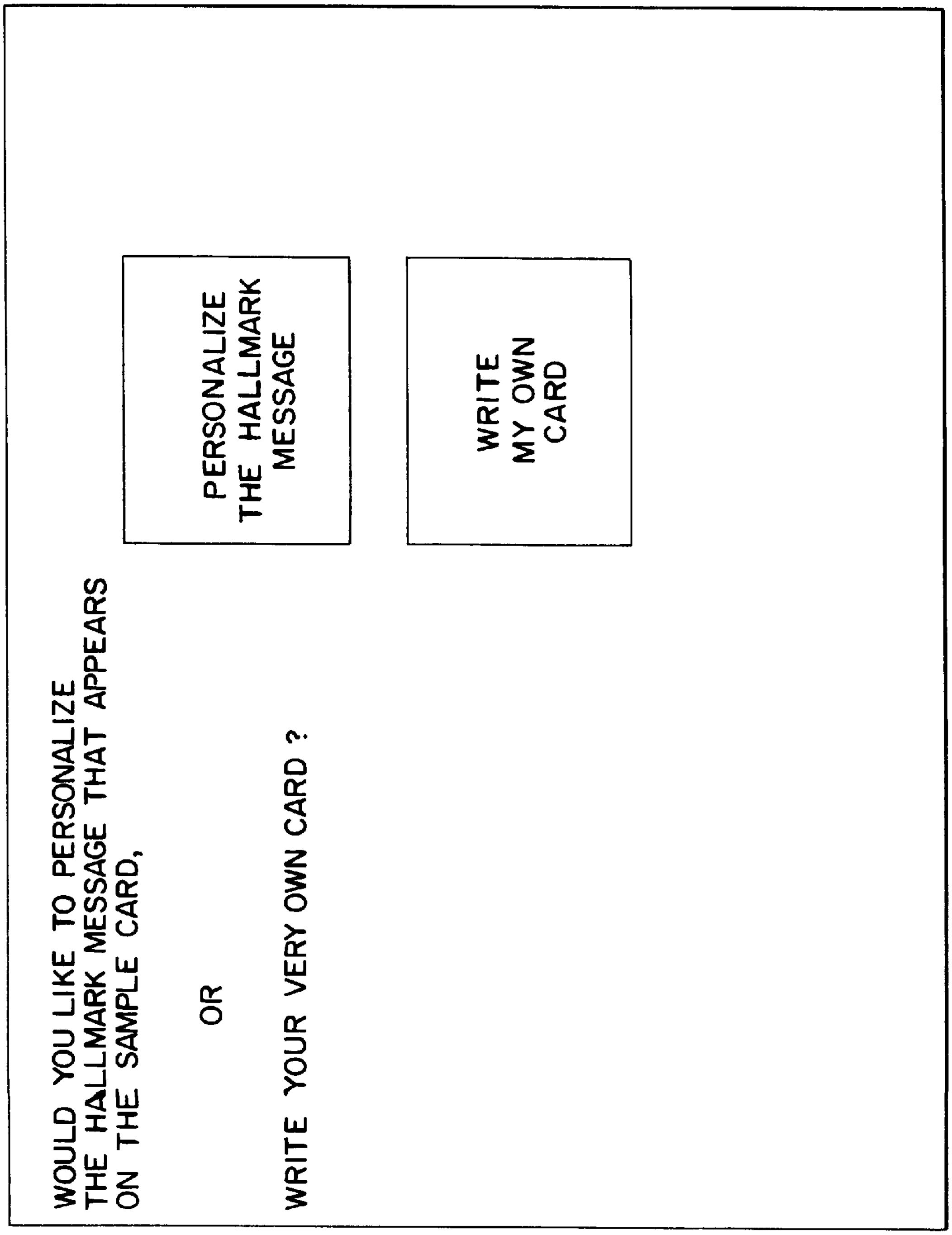
FIG. 8 illustrates a screen produced on the touch screen monitor for selection of personalization of a sample card message or writing by a customer of his or her own message.

If the customer touches the "Yes" box of FIG. 7, a screen is produced on the touch screen monitor 12 as shown in FIG. 8 for selection of personalization of a sample card message or writing by a customer of his or her own message.

Figure 9:
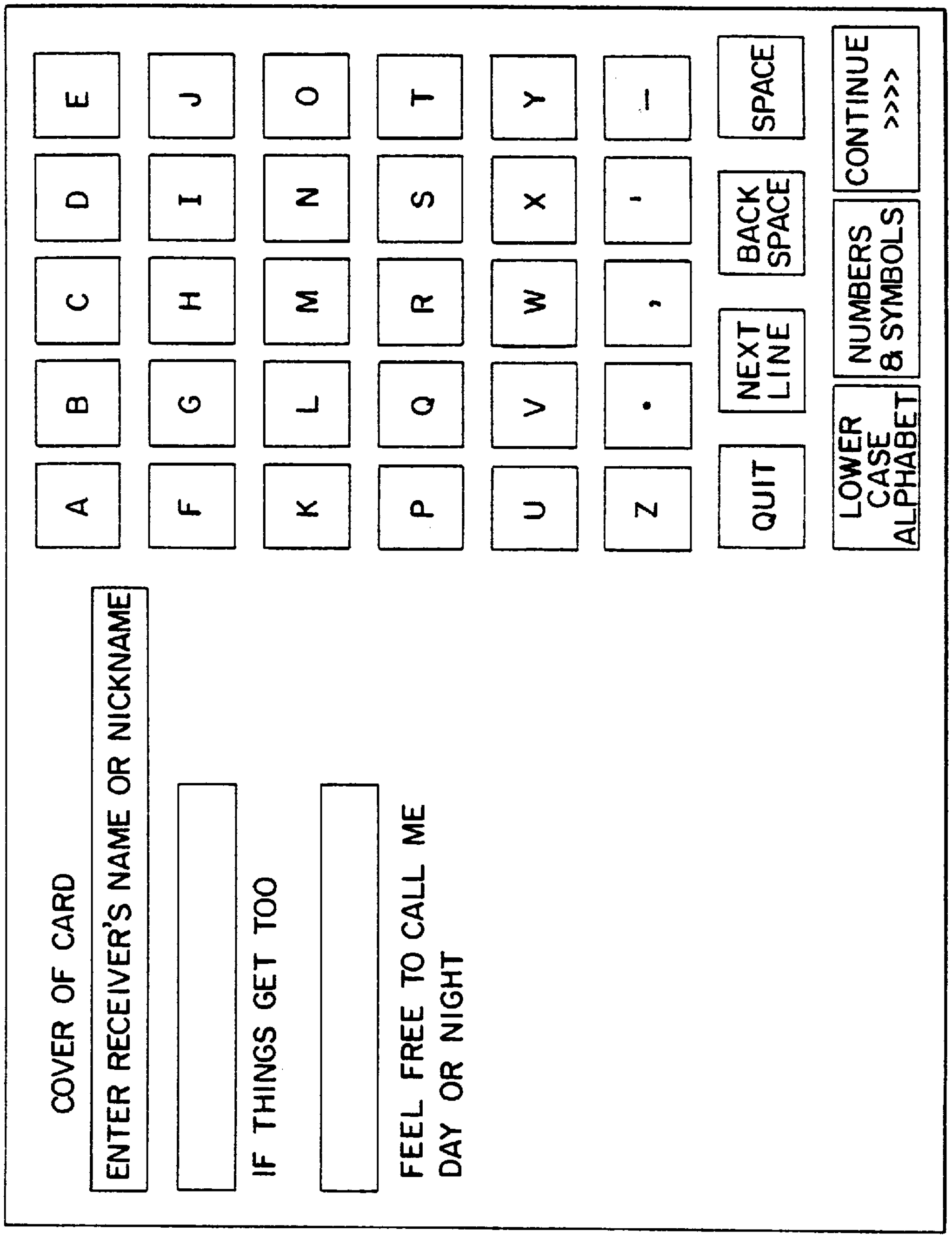
FIGS. 9 and 10 illustrate screens produced on the touch screen monitor for entry of words to personalize a sample card message.

If the customer touches the "Personalize the Hallmark Message" box of FIG. 8, a screen is produced on the touch screen monitor 12 as shown in FIG. 9 for entry of words to personalize a sample card message. In this screen instructions are provided to enter the receivers name or nickname and a box in which the name or nickname is to appear, and a keyboard operation is provided which permits toggling between upper and lower case modes. Initially, the operation is in an upper case mode for entry of the first letter of a receiver's name, but a "Lower Case Alphabet" box appears at the lower left of the keyboard for shifting to the lower case mode if desired. After entry of the first letter, or touching of the "Lower Case Alphabet" box, the operation is shifted to a lower case mode in which the color of the keyboard boxes is changed and in which an "Upper Case Alphabet" box appears at the lower left.

Figure 10:
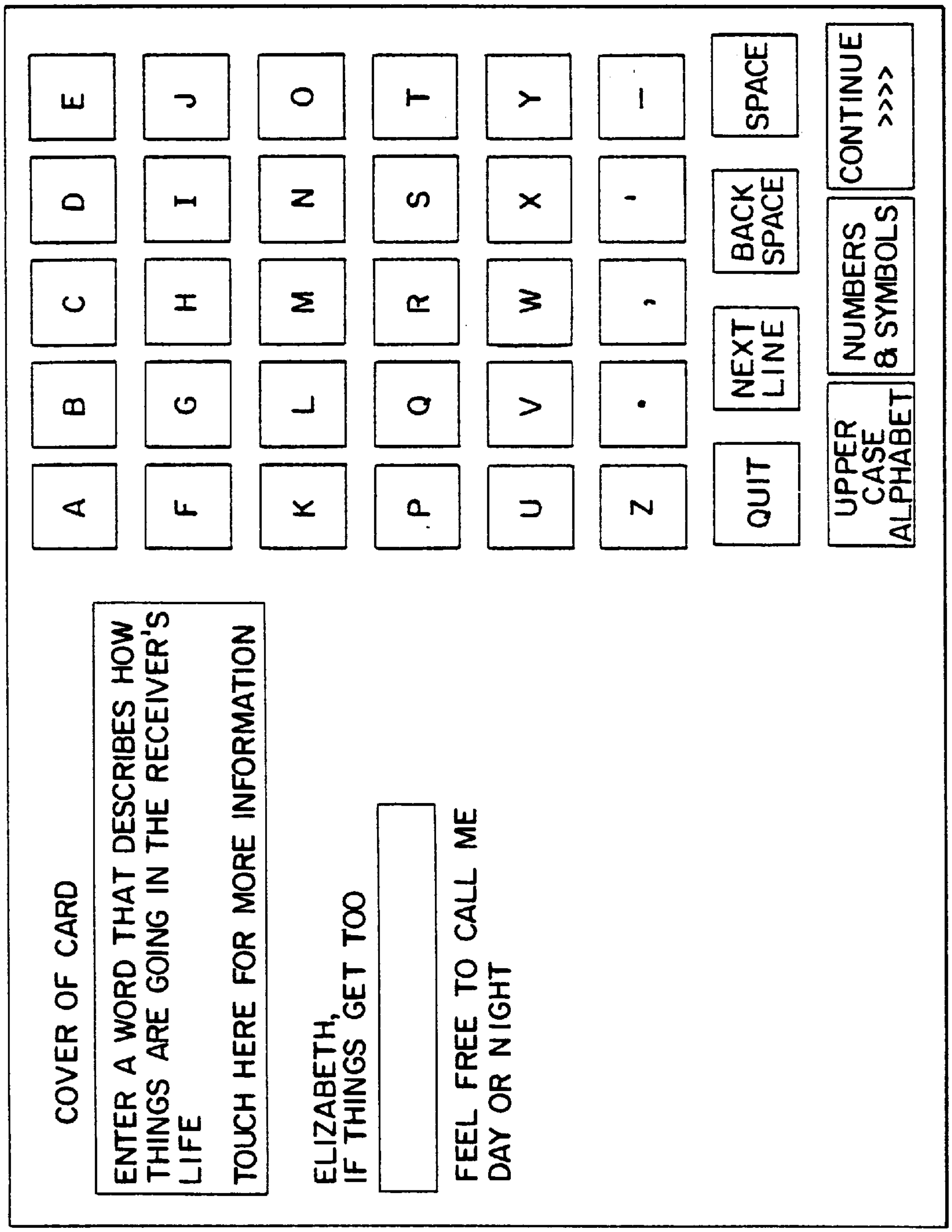

When the "Continue" box of FIG. 9 is pressed, a screen as shown in FIG. 10 is produced for entry of additional words in personalization of a sample card message and with instructions and a box to be touched if more information is desired, which may include suggestions for possible words to be entered in the message of the sample card which has been selected. As shown, the keyboard is in a lower case mode, but may be shifted to the upper case mode, if desired, by touching the box at the lower left, the screen being otherwise the same as shown in FIG. 10. It is noted that in either the upper case mode or the lower case mode, a "Numbers & Symbols" box may be touched, and a screen, is produced which is the same as shown in FIG. 10 but with a numbers and symbols keyboard. The numbers and symbols keyboard, not shown, contains, in addition to the ten decimal digits, "!", "?", ":", ",", "%", "$" and "-" characters or marks, a heart symbol, "/", "#", "(", ")" and "*" characters, up and right arrows, a quote mark, period and ampersand and left and down arrows, followed by "Quit", "Next Line", "Back Space", "Space", "Upper Case Alphabet", "Lower Case Alphabet" and "Continue" boxes.

Figure 11:
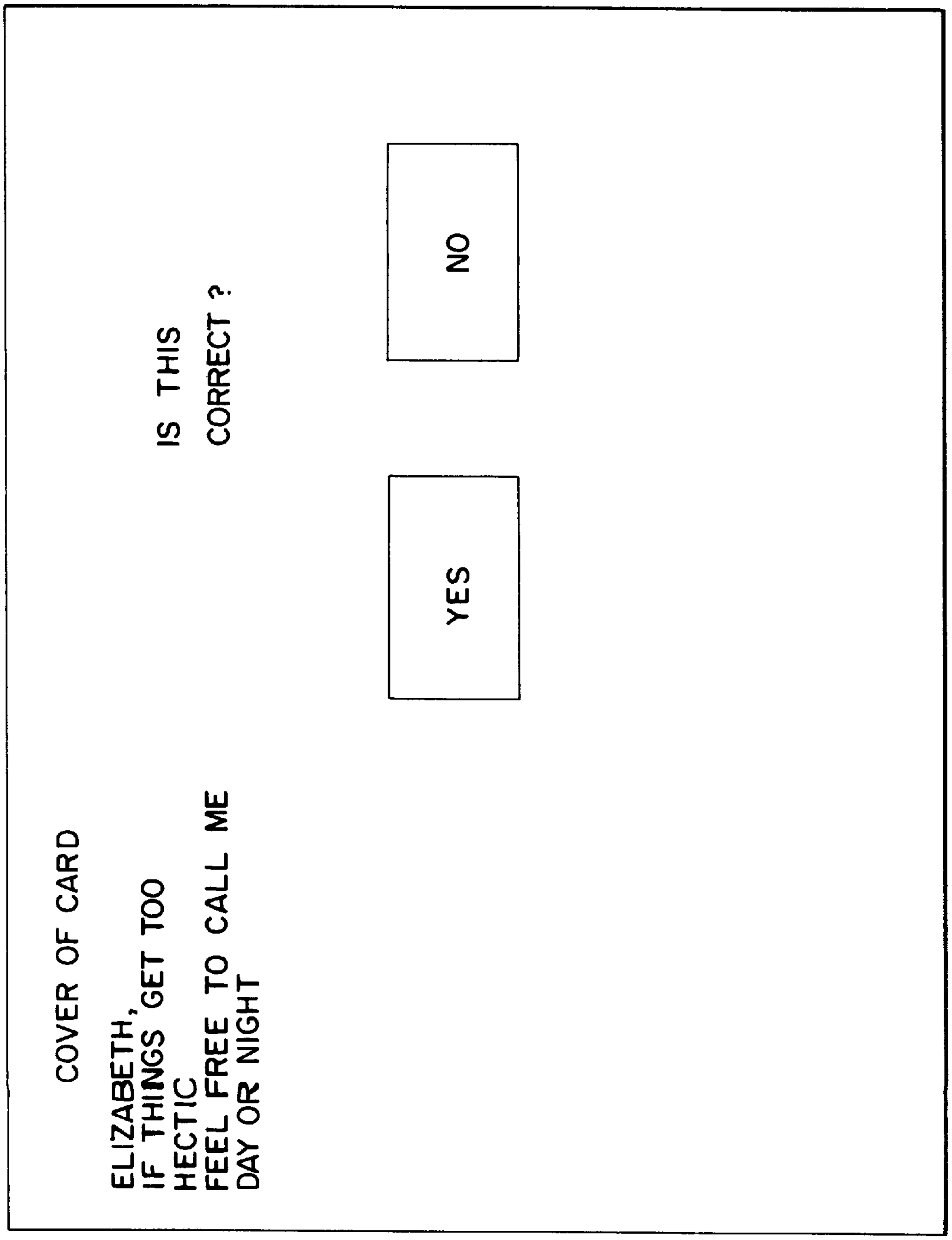
FIG. 11 illustrates a screen for verification of words entered for personalization of a sample card message.

When the "Continue" box is touched while producing the screen of FIG. 10 with the lower case keyboard or with the alternative upper case or number and symbols keyboards, the screen of FIG. 11 is produced for verification of the text to be included in the cover of the card. If the "No" box of FIG. 11 is touched, the screen of FIG. 9 is again produced, allowing the customer to change from the prior entries for personalization of the Hallmark message for the cover of the selected card.

If the "Yes" box of FIG. 11 is touched, an initial screen is produced for entry of text in the inside of the card, invoking a procedure which is not shown and described in detail but which is quite similar to that used for entry of text on the cover of the card. Upon touching a "Continue" box to indicate approval of the text for the inside of the card, a further procedure is invoked for entry of the customer's name and/or other text on the back of the card. Then, upon touching a box to indicate a final approval, a screen is produced to allow the customer to personalize another item or to proceed with completion of the card. In the latter case, a screen is produced instructing the customer to replace the sample card in the rack and remove a blank card, and take it to the sales associate at the printing or completion station 13.

Figure 12:
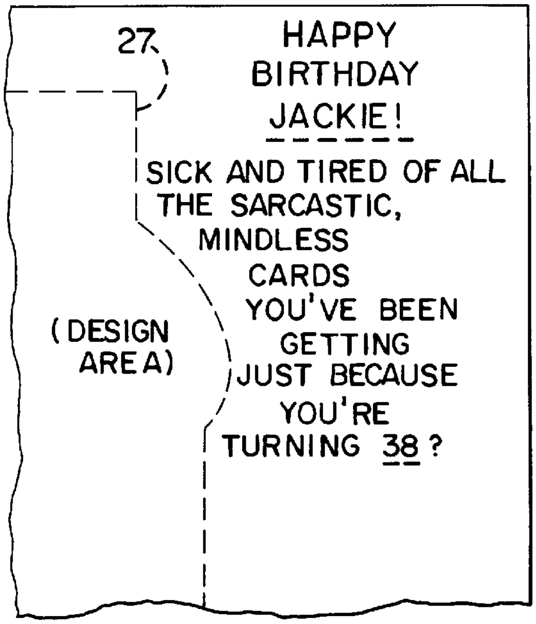
FIGS. 12 and 13 show examples of text which may be included on the front cover and on an extending flap and inside of a sample card.
Figure 13:
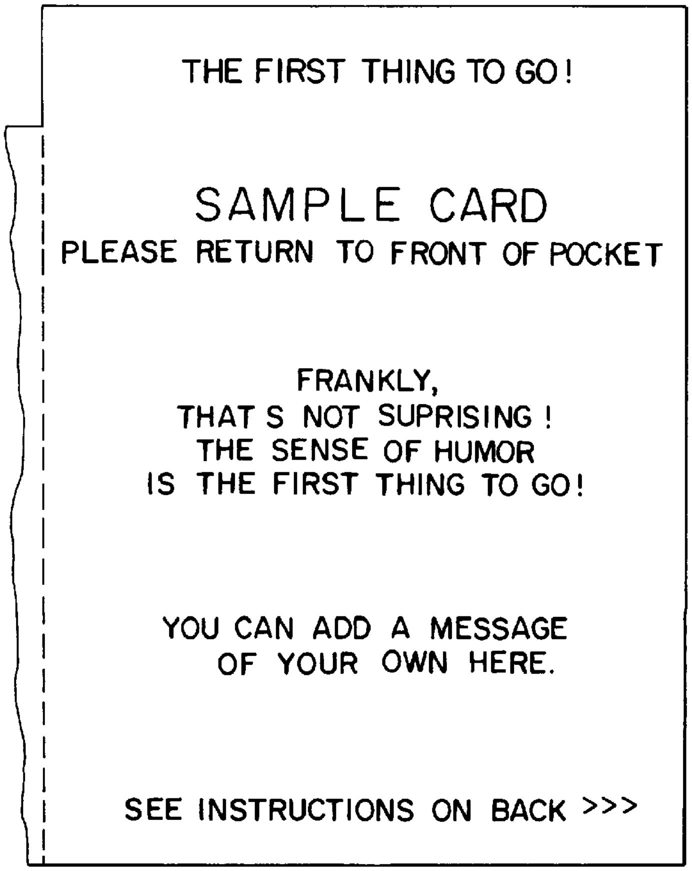

FIG. 12 shows the front cover of a sample card which has been given the title "THE FIRST THING TO GO!" While FIG. 13 shows text included on an extending flap and on the inside of the same card. Sample text as shown has a configuration which is complementary to and which registers with or matches that of an irregularly shaped border 27 of a design which is not shown in detail but which is indicated by a dashed line in FIG. 12. For sample designs with other configurations, the position of sample text is changed to match the configuration of the design, typically being either adjacent an irregularly shaped periphery of a design or within a design in a generally open space thereof. Broken underlines under name and age entries in the sample indicate that the customer may insert his or her own entries at these points, if the suggested message option is selected.

The broken underlines appear only on the sample card and will not appear on the finished card. The computer retrieves template data from memory which corresponds to the stock or code number entered by the customer to print sample text as personalized by the customer, or as entered in the "WRITE YOUR OWN CARD" procedure, in a position and orientation and with one or more fonts as shown in the sample card.

As shown in FIG. 13, the title of the card "THE FIRST THING TO GO!" appears only on an extending flap of the sample card, there being no extending flap on a blank card. The inside includes instructions as shown, the text to be imprinted if the suggested message option is selected, and a showing of where an additional message may be added by the customer. It also includes a direction to see instructions on the back of the sample card.

The instructions on the back of the sample card are not shown in the drawings, but have a format as follows:

To personalize this card you'll need to supply the following information:

(Broken underlines indicate this information within the text. The underlines wilt not appear on your finished card.)

*RECEIVER'S NAME
*RECEIVER'S AGE

OR

You can write the entire card yourself.

INSTRUCTIONS:

1. Take a corresponding blank card and envelope from the pocket.
2. Go to the computer where you can personalize your card by touching the screen.
3. Take a blank card and envelope to the cash register where your card will be imprinted.

If you need assistance, a sales associate will be happy to help you.

The back of the card also includes an identification code for the card in the form of numbers and/or ASCII characters which are highlighted in yellow, for use as described in connection with FIG. 6.

With reference to FIG. 8, the customer is provided with the option of writing his or her own card, by touching the "Write My Own Card" box. In this case, a front cover text entry and editing screen is produced. The screen is similar to FIG. 9, but with an instruction to enter text as desired, and with a series of highlighted lines in which text appears as it is entered by the customer by touching the boxes of the keyboard of the screen. By way of example, 5 or more lines may be displayed for entry of up to about 30 characters in each line. By touching the "Next Line" box, the customer may change the line which he or she desires to edit or into which text is initially being entered, and the "Back Space" box may be touched for deletion of a character.

When the text displayed in the front cover text entry and editing screen is believed to be satisfactory, the "Continue" box is touched, whereupon a screen is produced similar to that shown in FIG. 11, displaying the text and asking "Is this Correct". If the "No" box is touched, the front cover text entry and editing screen is again displayed to permit editing as desired. If the "Yes" box is touched, an inside text entry and editing screen is produced for entry of text as desired, in the same fashion as for the front cover. Then, a back cover text entry and editing screen is produced in the same fashion. The customer may thus write all of his or her own text for the card.

The operations for personalizing announcements and invitations and for personalizing "Times" cards are similar to the operations for greeting cards, differing in that, in accordance with the invention, the formats are tailored to correspond to the item. For example, announcements and invitations may be either on folded or unfolded cards, and the formats of "Times" cards are generally substantially different from those of greeting cards. It should be noted that comic strip type cards, such as cards using "Peanuts" characters can be produced with the system of the invention and are included under the "Times" category in view of the similarity in format. The system of the invention is, of course, very flexible and versatile with respect to the types of greeting card products which can be produced.

The term "greeting card" as used in the claims, is intended to be broadly construed to encompass thee traditional form of greeting card as well as announcements, invitations, personalized "times", personalized calendars and other similar paper or board products.

Figure 14:
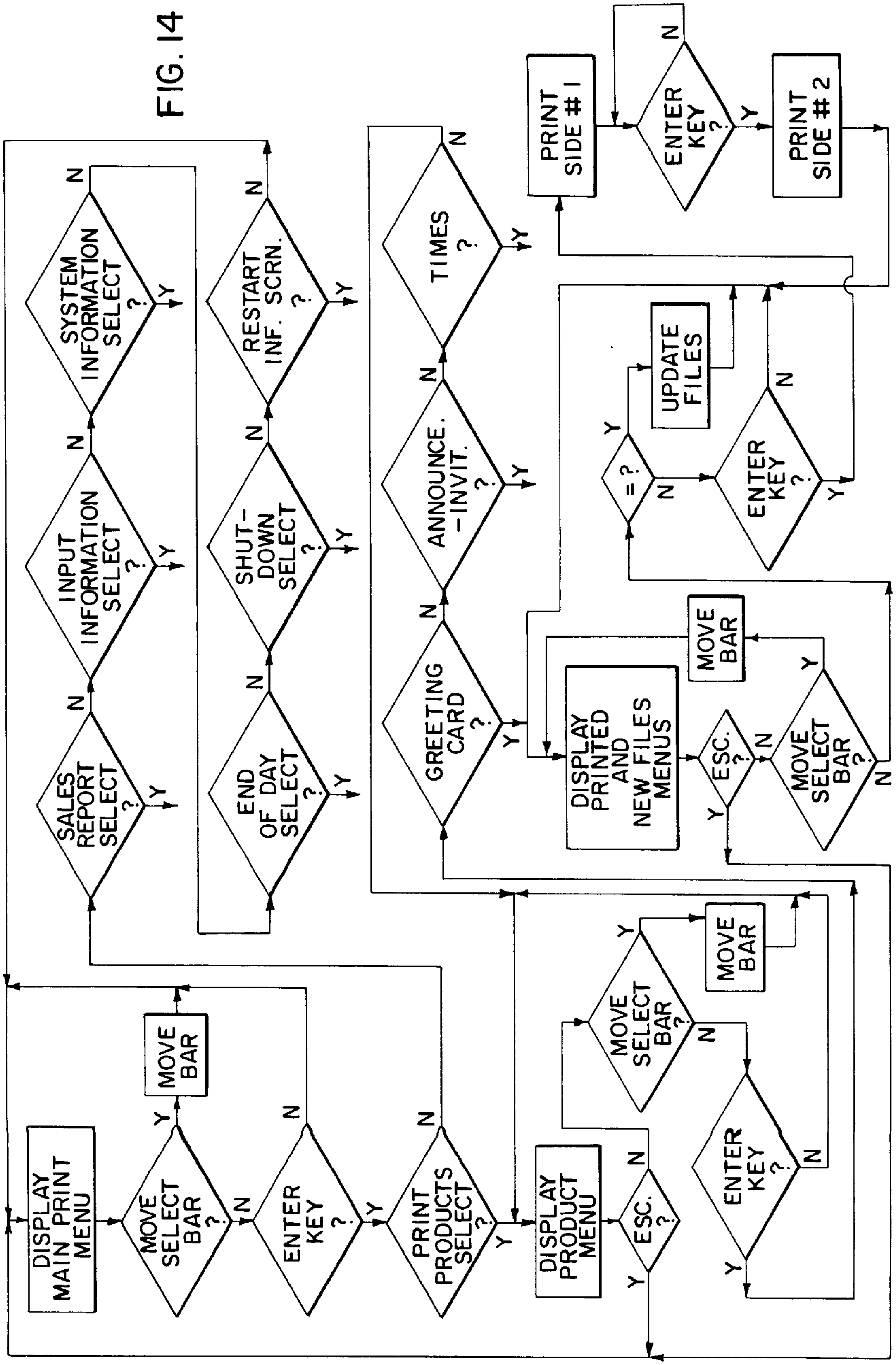
FIG. 14 is a flow diagram of printing operations performed under operator control at the card completion station of the system.

The operations at the card completion station 13 are depicted in the flow chart of FIG. 14. Initially, a main menu is displayed on the screen of monitor 18 which contains a series of seven line items which may be selected by using the space bar or up and down cursor keys of the keyboard 17 to move a "select" bar to highlight the item, and then pressing the "Enter" key of the keyboard 17. The Menu is in the following form:

| Select a Function |
|---|
| 1) Print Product |
| 2) Sales Report |
| 3) Input Information |
| 4) System Information |
| 5) End of Day |

-continued

| Select a Function |
|---|
| 6) Shut Down System |
| 7) Restart Ad Graphics |

FIGS. 17–20 show cards produced with the system of the invention and showing the advantages of providing a template for each stock or code number, as aforementioned, each template being in the form of data stored in memory and retrieved during the printing operation to print a card in the same position and orientation and with one or more fonts as shown in the sample card or as modified by the customer in the personalization process.

The cards of FIGS. 17–20 illustrate the following:

1) The actual placement of text "in register" with the preprinted design as illustrated with the personalized text inside the yardsigns on the inside pages of card 300 PBG 20-9 (FIG. 19);
2) The addition of "personalized text" to text existing in the memory of the computer for each specific stock number, as shown with "Kansas City" on inside page 3, of 300 PBG 23-4 (FIG. 18);
3) The "slanting" of the base line of text, as shown on the personalized text inside the yardsigns of 300 PBG 20-9 (FIG. 19);
4) The "curving" of the base line of text, as shown on the front cover of 300 PBG 23-4 in "Happy 12th Birthday, Chris" (FIG. 20);
5) The combination of different type styles on the same card and even on the same page, as shown on the back panel of both samples: "It's Personalized" uses a different font than the personalized "Just for you by Aunt Mary and Uncle Joe" with 300 PBG 23-4, and "Just for You by Mom and Dad" with 300 PBG 20-9. The number of different fonts used on one stock number may be up to six or more. 3 to 4 different fonts may typically be used on the same card.

As has been previously explained, the customer may supply his or her own text, and in such cases, it will be printed under template control.

If the "Print Products" option is selected by pressing the "Enter" key while it is highlighted, a product menu is displayed in a form as follows:

| Type of Card |
|---|
| 1. Greeting Card |
| 2. Announcement/Invitation |
| 3. Personalized Times |

The "ESC" key of the keyboard 17 may be pressed to exit this and other menus and return to the main menu and the space bar or up and down cursor keys may be used to move the highlighting select bar. If the "Enter" key is pressed, the highlighted item is selected. As indicated in FIG. 14, if the "Greeting Card" option is selected, printed and new files menus are displayed. Such menus are displayed in side-by-side relation on the screen of the monitor 18, each containing listings of files by customer initials, with the corresponding stock number and the time of its creation.

If a customers initials do not appear, the "=" key of the keyboard may be used to perform an "Update Files" procedure, in which a file which is temporarily stored in the RAM of the computer 14 during operation of the touch screen monitor 12 by a customer is stored on a hard disc of the computer 14. When a customer requests printing of a card, the sales associate uses the "=" key if necessary to make the file entry appear, highlights the entry and compares the entry with the blank card presented by the customer to make sure that they match. The sales associate then places the blank card in an input tray 28 of the printer 20 with the front and back covers up and moves the card into the printer with the left edge of the blank card against a left guide of the tray 28. Then the sales associate presses the "Enter" key of the keyboard. Printing of one side of the card then proceeds, the progress being indicated on the screen of the monitor 18. When complete, the sales associate removes the card from an output tray 30 of the printer 20, turns it over and again places it on the input tray, moves it into the printer and presses the "Enter" key.

The operation for announcements and invitations and the operation for "Times" cards are different from the operation for greeting cards, but are of the same general nature. Announcements and invitations may be printed in pairs, the cards of each pair being respectively held against left and right guides of the input tray 28 when inserted into the printer and they are in a certain minimum quantity. Provision is made for displaying the quantity ordered, for changing the order and for keeping track of the number which have been printed. Provision is also made for temporarily interrupting printing of an order for a large quantity to allow fast printing of small orders, and to continue with printing of the interrupted large order when it is possible to do so.

One item in the main print menu is "Input Information". If this item is selected, the sales associate at the completion station may, at the request of a customer, use the keyboard 17 to follow instructions in screens produced by the monitor 18 and make all of the same entries as made using the touch screen monitor 12.

Figure 15:
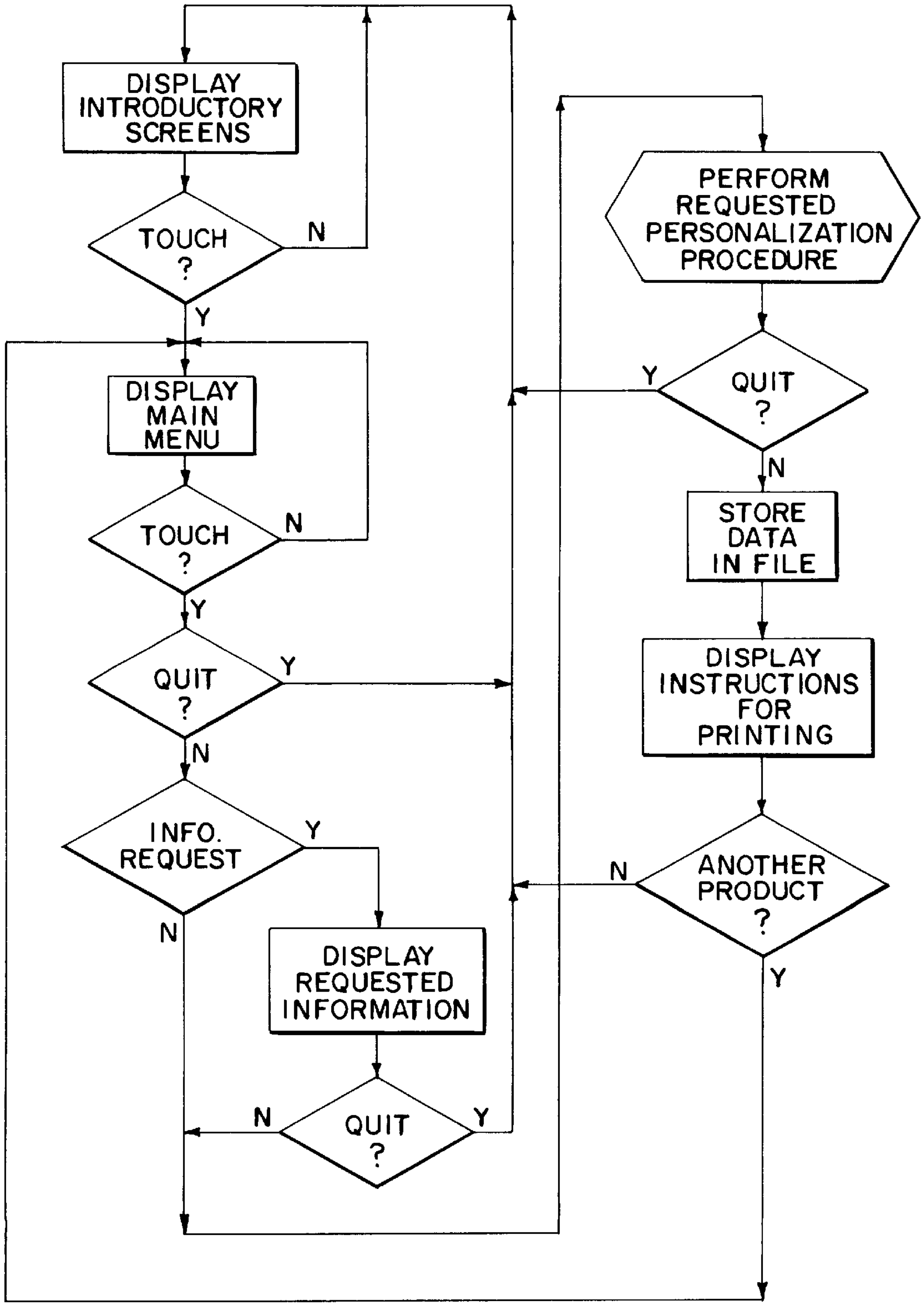
FIGS. 15 and 16 are flow diagrams showing operations for customer input of text and control data.
Figure 16:
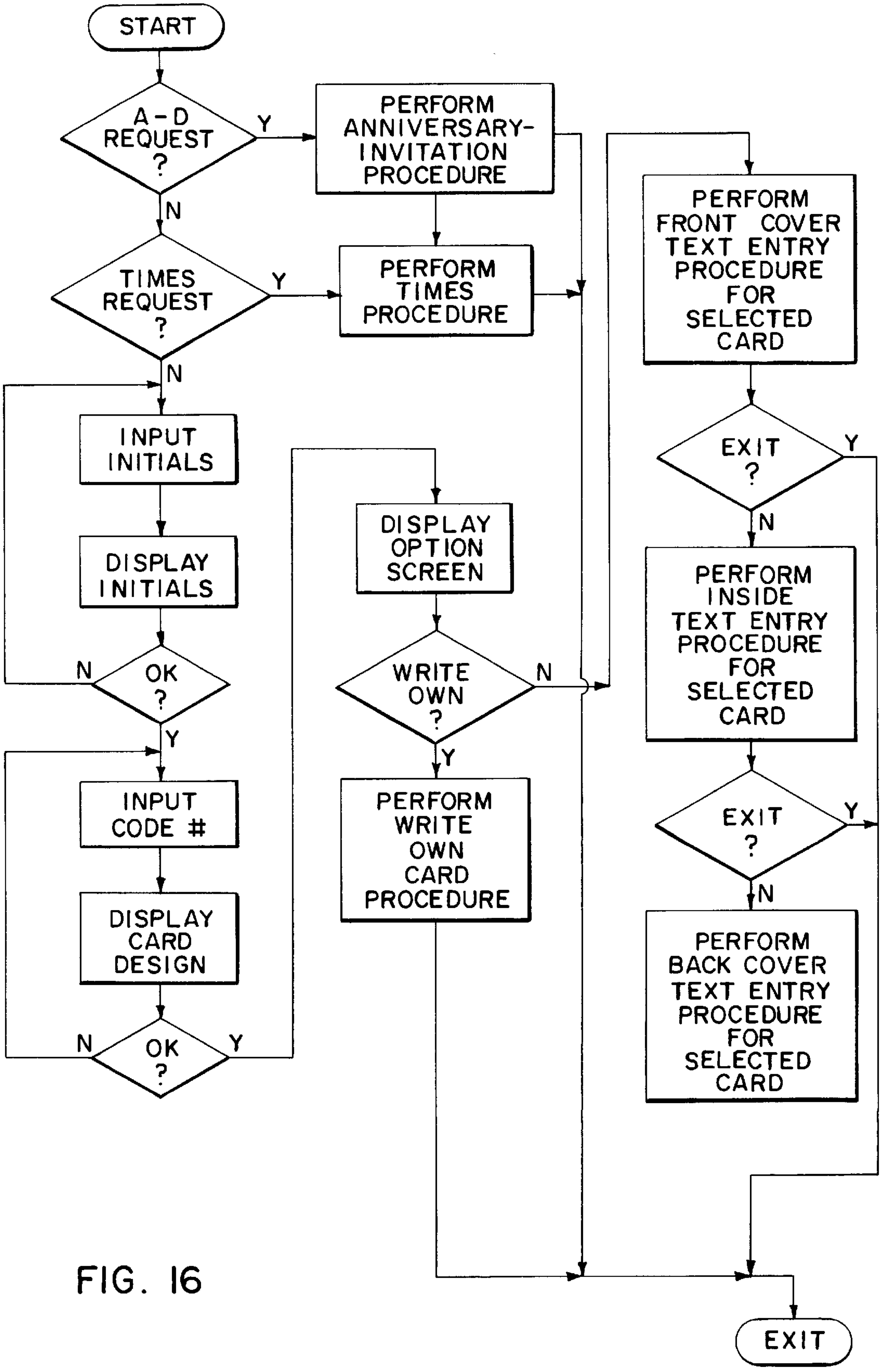
Figure 17:
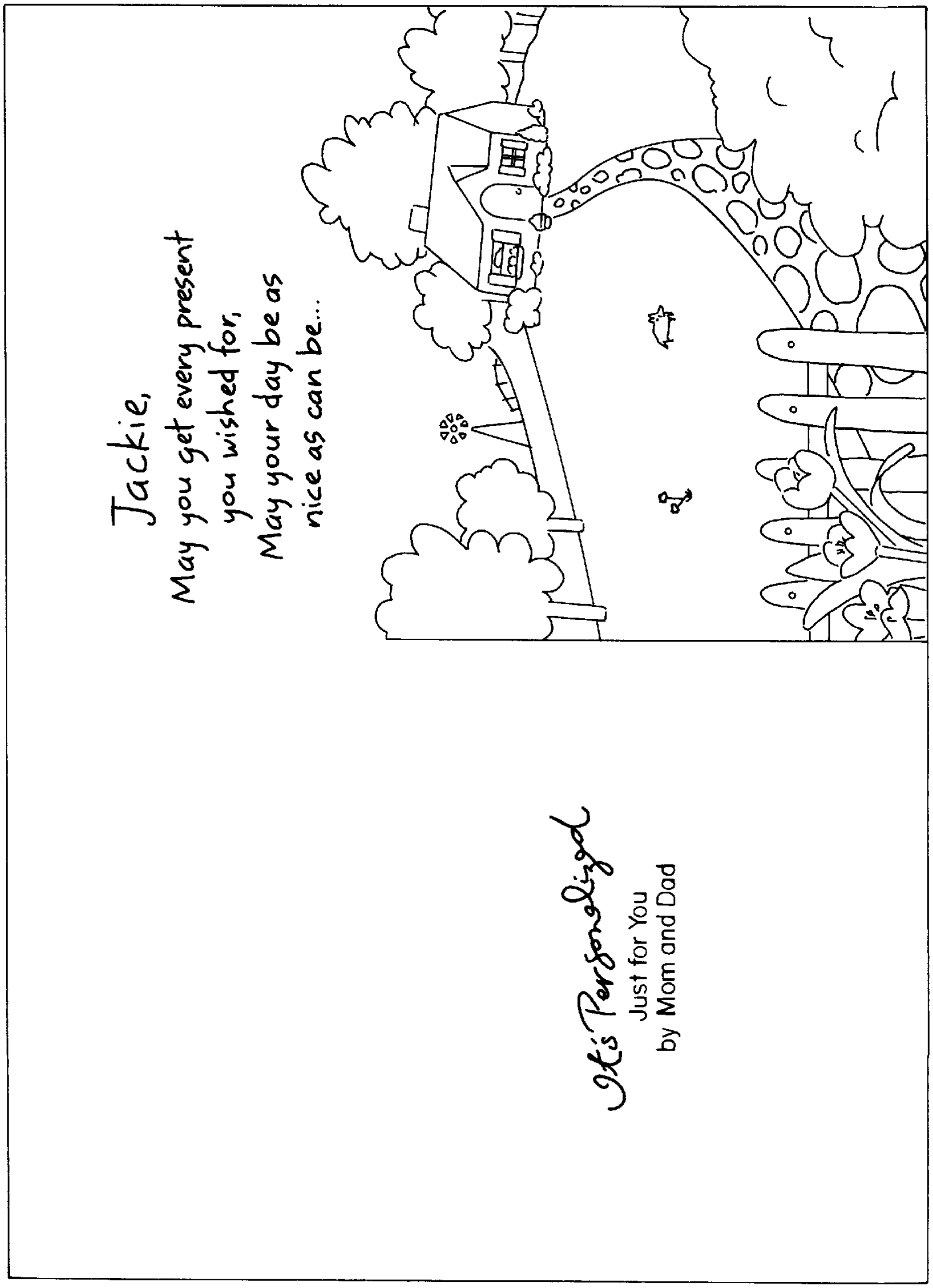
FIG. 17 depicts the front and back cover pages of card No. 300 PBG-20-9 produced by the system of the present invention. The front cover page shows a personalized text and a picture of the house. The back cover page shows the personalized text "It's Personalized".
Figure 18:
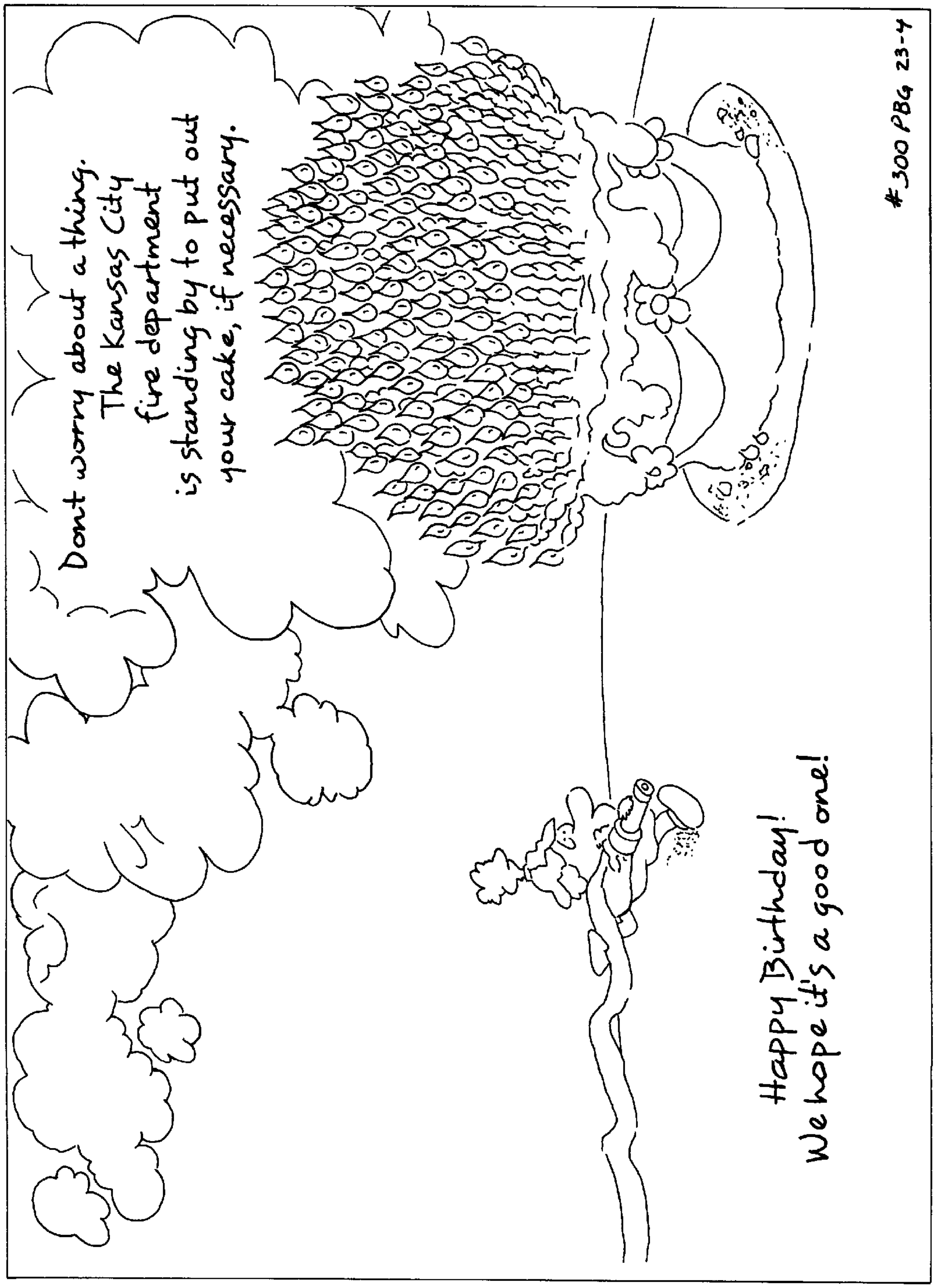
FIG. 18 depicts the inside pages of card No, 300 PBG 23-4 and illustrates the capability of the inventive system to add a personalized text such as the personalized text, "Kansas City".
Figure 19:
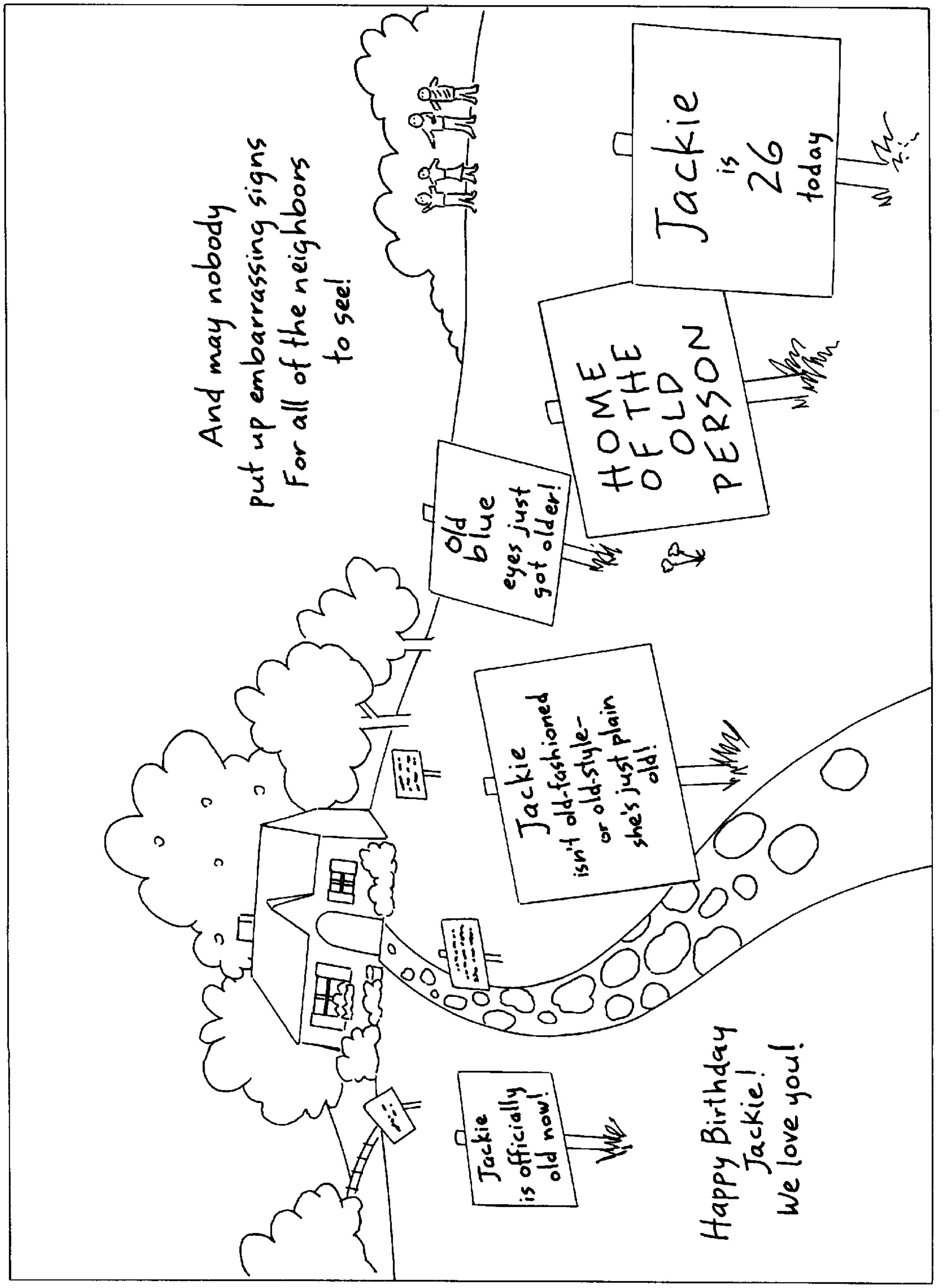
FIG. 19 depicts the inside pages of card No. 300 PBG 20-9 and illustrates the capability of the inventive system to add a text with a "slanting" base line as shown by the personalized text inside the yardsigns.
Figure 20:
FIG. 20 depicts the front and back cover pages of card No. 300 PBG 23-4 and illustrates the capability of the inventive system to add a text with a "curving" base line, as shown by the message "Happy $12^{th}$ Birthday, Chris".

FIG. 15 is a flow diagram illustrating overall operations as described hereinabove for input of card selection and text data by a customer. FIG. 16 is a flow diagram illustrating operations as also described hereinabove for performing a personalization procedure when requested from a main menu. In FIG. 16, procedures for performing text entry entries for the front cover, inside and rear cover of a card are illustrated. It will be understood from the foregoing discussion that similar procedures are used for when the "Write Own Card" option is selected, and also that the anniversary/invitation and times procedures are similar to those illustrated for the front, inside and back covers of a greeting card in the flow diagram of FIG. 16.

It will be understood that modifications and variations may be effected without departing from the spirit and scope of the novel concepts of this invention.

What is claimed is:

1. A system for use by an individual customer to obtain a personalized greeting card of high quality, said system comprising: card type selection means for permitting an individual customer to obtain a completed personalized card from one of a plurality of blank cards having a preprinted design on at least a portion thereof and arranged proximate to the customer, design selection means for selection by the individual customer from a plurality of available designs of a design to be provided on said completed personalized card, said plurality of available designs corresponding, at least in part, to said plurality of preprinted designs on said blank cards, message selection means for use by said individual customer to select particular printed material to be provided on said completed card, and card completion means, and control means for controlling said card completion means from said card type, design and message selection means for supply by said card completion means of a completed greeting card having said selected design said selected printed material thereon.

2. A system as defined in claim 1, wherein said card type selection means comprises rack means for supporting said plurality of blank cards thereon for selection by the customer of at least one of said cards to be carried by the customer to said card completion means and to be processed by said card completion means to supply said completed greeting card having said selected design and said selected printed material thereon.

3. A system as defined in claim 2, wherein said rack means support a plurality of sample cards having various designs printed thereon to provide the customer with information as to the appearance of a completed greeting card.

4. A system as defined in claim 3, wherein said rack means support a plurality of said blank cards in association with each of said sample cards, each of said blank cards having a design thereon corresponding to that on said sample card with which it is associated.

5. A system as defined in claim 4, wherein said card completion means comprises a printer controlled by said control means from said message selection means and operative to print said particular printed material selected by a customer on a blank card carried by a customer to said card completion means.

6. A system as defined in claim 3, wherein said plurality of sample cards further include printed instructional material to assist the customer in operation of said design selection and message selection means.

7. A system as defined in claim 2, wherein said card completion means comprises a printer controlled by said control means from said message selection means and operative to print said particular printed material selected by a customer on a blank card carried by a customer to said card completion means.

8. A system as defined in claim 1, wherein said control means include storage means for storage of design and message selection data generated by said customer through operation of said design and message selection means, and said control means including means for subsequent control of said card completion means from stored design and message selection data.

9. A system as defined in claim 8, wherein said card completion means is operable by an operator separate from the customer, and wherein said control means includes means for checking by the operator of stored design and message selection data before effecting operation of said card completion means.

10. A system as defined in claim 1, wherein said card selection means comprise rack means for supporting sample cards having various designs printed thereon to provide the customer with information as the appearance of a completed greeting card.

11. A system as defined in claim 10, wherein said sample cards have information text printed thereon to guide the customer as to operation of said message selection means, and wherein no text corresponding to said information text is printed by said card completion means on a completed greeting card.

12. A system as defined in claim 11, wherein said sample cards have suggested greeting text printed thereon for optional selection during operation of said message selection means by said individual customer.

13. A system as defined in claim 1, further including a monitor disposed proximate to said plurality of blank cards controllable by the customer under control of said control means to present a series of screens to guide the customer in selection of design of a card and messages to be provided thereon so as to provide said design selection and message selection means.

14. A system as defined in claim 13, wherein said card selection means comprise rack means for supporting sample cards having various designs printed thereon to provide the customer with information as the appearance of a completed greeting card, said sample cards having information text printed thereon to guide the customer as to control of operation of said monitor and selection of the design of a sample card and text to be printed on a completed card.

15. A system as defined in claim 14, wherein said sample cards have suggested greeting text printed thereon for optional selection during operation of said message selection means by said individual customers, said suggested greeting text including indications of positions of placement names and other text to be optionally supplied by the customer, and said screens providing reproductions of said suggested greeting text and showing text supplied by the customer at said positions of placement.

16. A system as defined in claim 13, said monitor being operable by said control means to present for verification a visual representation of a design selected by a customer.

17. A system as defined in claim 1 for producing greeting cards of a folded type having a front cover, an inside and a back cover, said message selection means being operable by the customer for selection of text to be printed on said front cover and text to be printed on said inside.

18. A system as defined in claim 17, said design selection means being operable by the customer to select a card of a non-folding type, and said message selection means being operable by the customer for selection to text to be printed on at least one side of a card of a non-folded type.

19. A system as defined in claim 18, wherein said control means include storage means for storage of design and message selection data generated by said customer through operation of said design and message selection means, and said control means including means for subsequent control of said card completion means from stored design and message selection data and arranged for printing of either said folding or non-folding type as selected by the customer and stored by said storage means.

20. A method of producing greeting cards using a monitor and an associated customer-operated selection control and a printer which is controllable by a computer in accordance with supplied control data for printing of text, comprising the steps of providing a plurality of blank cards disposed proximate to the monitor, the blank cards having different designs printed thereon for selection by a customer, assigning a card design control code to each design for use by a customer in selecting the design, presenting a screen on the monitor for entry of a card design control code by the customer for selection of a card design, presenting one or more screens on the monitor for selection of message text by the customer to be printed on a blank card, and supplying card design and control data to the computer in accordance with card design and message text to be printed by the printer on a blank card.

21. A method as defined in claim 20, including the step of presenting a screen on the monitor containing a visual representation of a card design corresponding to a control code entered by the customer and containing a request for verification by the customer.

22. A method as defined in claim 20, including the step of storing card design and message data prior to operation of the printer therefrom, and comparing a blank card presented by a customer with stored control data for verification prior to printing of text on the blank card.

* * * * *